(12) United States Patent
Sauve et al.

(10) Patent No.: US 8,706,383 B2
(45) Date of Patent: Apr. 22, 2014

(54) DISTRIBUTED FUEL DELIVERY SYSTEM FOR ALTERNATIVE GASEOUS FUEL APPLICATIONS

(75) Inventors: Marc Sauve, Bowmanville (CA); Louis A. Avallone, Milford, MI (US); Karl H. Kozole, Oshawa (CA)

(73) Assignee: GM Global Technology Operations LLC

( * ) Notice: Subject to any disclaimer, the term of this patent is extended or adjusted under 35 U.S.C. 154(b) by 561 days.

(21) Appl. No.: 12/949,273

(22) Filed: Nov. 18, 2010

(65) Prior Publication Data

US 2011/0202256 A1    Aug. 18, 2011

Related U.S. Application Data

(60) Provisional application No. 61/304,698, filed on Feb. 15, 2010.

(51) Int. Cl.
*B60T 7/12* (2006.01)

(52) U.S. Cl.
USPC ............ 701/105; 123/434; 123/674; 123/679

(58) Field of Classification Search
USPC .......... 701/103–105, 114, 115; 123/434, 436, 123/673, 674, 679, 690
See application file for complete search history.

(56) References Cited

U.S. PATENT DOCUMENTS

| 6,176,222 | B1 * | 1/2001 | Kirwan et al. | 123/492 |
| 6,360,726 | B1 * | 3/2002 | Javaherian | 123/491 |
| 7,765,053 | B2 * | 7/2010 | Gwidt et al. | 701/104 |

* cited by examiner

*Primary Examiner* — John Kwon

(57) ABSTRACT

A control system includes an engine control module that generates fuel injector command signals for fuel injectors of an engine and engine parameter signals that indicate operating characteristics of the engine. A fuel injector control module communicates with the engine control module via a network. The engine control module transmits the engine parameter signals to the fuel injector control module via the network. The fuel injector control module generates compensated fuel injector signals based on the fuel injector command signals and the engine parameter signals. The engine control module may generate fuel injector command signals for a gaseous fuel mode based on signals received from the fuel injector control module.

20 Claims, 7 Drawing Sheets

DISTRIBUTED FUEL DELIVERY SYSTEM FOR ALTERNATIVE GASEOUS FUEL APPLICATIONS

CROSS-REFERENCE TO RELATED APPLICATIONS

This application claims the benefit of U.S. Provisional Application No. 61/304,698, filed on Feb. 15, 2010. The disclosure of the above application is incorporated herein by reference in its entirety.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine control module (ECM) is typically configured to provide fuel delivery functions for a single liquid fuel, such as gasoline or other liquid fuel blend such as E85. The ECM may determine a cylinder fresh air charge primarily based on a mass air flow (MAF) signal from a MAF sensor. The ECM calculates a required fuel mass using open loop, closed loop and transient fueling algorithms based on the cylinder fresh air charge. During closed loop operation, the ECM monitors oxygen ($O_2$) sensors to correct fueling errors using fuel trim functions. Fuel injector characterization functions are used to convert the required fuel mass into an injector on time, which is executed by fuel injector output drivers of the ECM.

A fuel injector control module (FICM) may be used to enable an engine to operate on alternative gaseous fuels, such as compressed natural gas (CNG) and liquefied petroleum gas (LPG). The FICM is connected between the ECM and fuel injectors of the engine. The FICM has direct control of the fuel injectors for both mono-fuel applications (one fuel storage and delivery system) and bi-fuel applications (two different fuel storage and delivery systems, where each fuel is introduced into combustion chambers of the engine one at a time). The FICM selects which set of fuel injectors (injectors for a first fuel source or injectors for a second fuel source) to activate.

During gasoline operation in a bi-fuel system, the ECM generates and transmits a gasoline injector control waveform which is unchanged by the FICM to the gasoline injectors. During gaseous fuel operation, the FICM modifies the injector control waveform to compensate for gaseous fuel combustion characteristics, gaseous fuel delivery rail pressures and temperatures, manifold absolute pressures (MAPs), differences between gasoline and gaseous fuel dynamics, and differences between gasoline and gaseous fuel injector operating characteristics. The FICM modifies the injector control waveform by intercepting (prevents from being transmitted to the gasoline fuel injectors) fuel injector control signals generated by the ECM. The FICM generates compensated fuel injector signals based on the fuel injector control signals received from the ECM. Gaseous fuel injectors are operated based on the compensated fuel injector signals which are based on the gasoline fuel injector control signals from the ECM.

Closed loop fuel injection operation for emissions control uses an exhaust oxygen sensor to provide feedback to correct open loop fueling errors and impart the necessary relative air fuel ratio (AFR) bias, which is fuel source dependant. The $O_2$ sensor response characteristics are such that fuel control may be lean shifted when operating on gaseous fuels, rather than gasoline. The FICM intercepts or overrides the $O_2$ sensor signal provided to the ECM to compensate for this lean shift. The FICM prevents the $O_2$ sensor signal from being received by the ECM and substitutes a simulated $O_2$ sensor signal generated by the FICM when operating with the gaseous fuel. The FICM passes the $O_2$ sensor signal through to the ECM, unchanged during gasoline operation.

The simulated $O_2$ sensor signal from the FICM is used by the ECM to perform closed loop corrections. These closed loop corrections, based on the simulated $O_2$ sensor signal for operation with a gaseous fuel, cause the ECM to adjust fuel injector command signals accordingly. As a result, the FICM causes the ECM to generate fuel injector command signals with the appropriate relative air fuel ratio (AFR) bias for gaseous fuel source operation. The FICM may include injector drivers that supply sufficient current to operate gaseous fuel injectors for LPG and/or CNG fuel sources. LPG and CNG fuel injectors typically have different electrical characteristics than gasoline injectors (i.e. peak and hold current values are different).

SUMMARY

A control system is provided and includes an engine control module that generates fuel injector command signals for fuel injectors of an engine. The engine control module (ECM) generates engine parameter signals that indicate operating characteristics of the engine. A fuel injector control module (FICM) communicates with the engine control module via a network. The ECM transmits the engine parameter signals to the FICM via the network. The FICM generates compensated fuel injector signals based on the fuel injector command signals and the engine parameter signals. The FICM may further generate the compensated fuel injector signals based on gaseous fuel pressure and temperature, and system voltage.

In other features, an ECM is provided. The ECM includes a first adaptation module that stores a first long term multiplier for a primary fuel. A second adaptation module stores a second long term multiplier for a secondary fuel. A fuel mode module receives a fuel mode signal from a fuel injector control module via a network and enables one of (i) the first adaptation module and (ii) the second adaptation module based on the fuel mode signal. A closed loop fuel module generates a first gain signal based on the first long term multiplier when operating on the first fuel source and a second gain signal based on the second long term multiplier when operating on the second fuel source. A fuel injection module generates a fuel injector command signal based on one of the first gain signal and the second gain signal.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
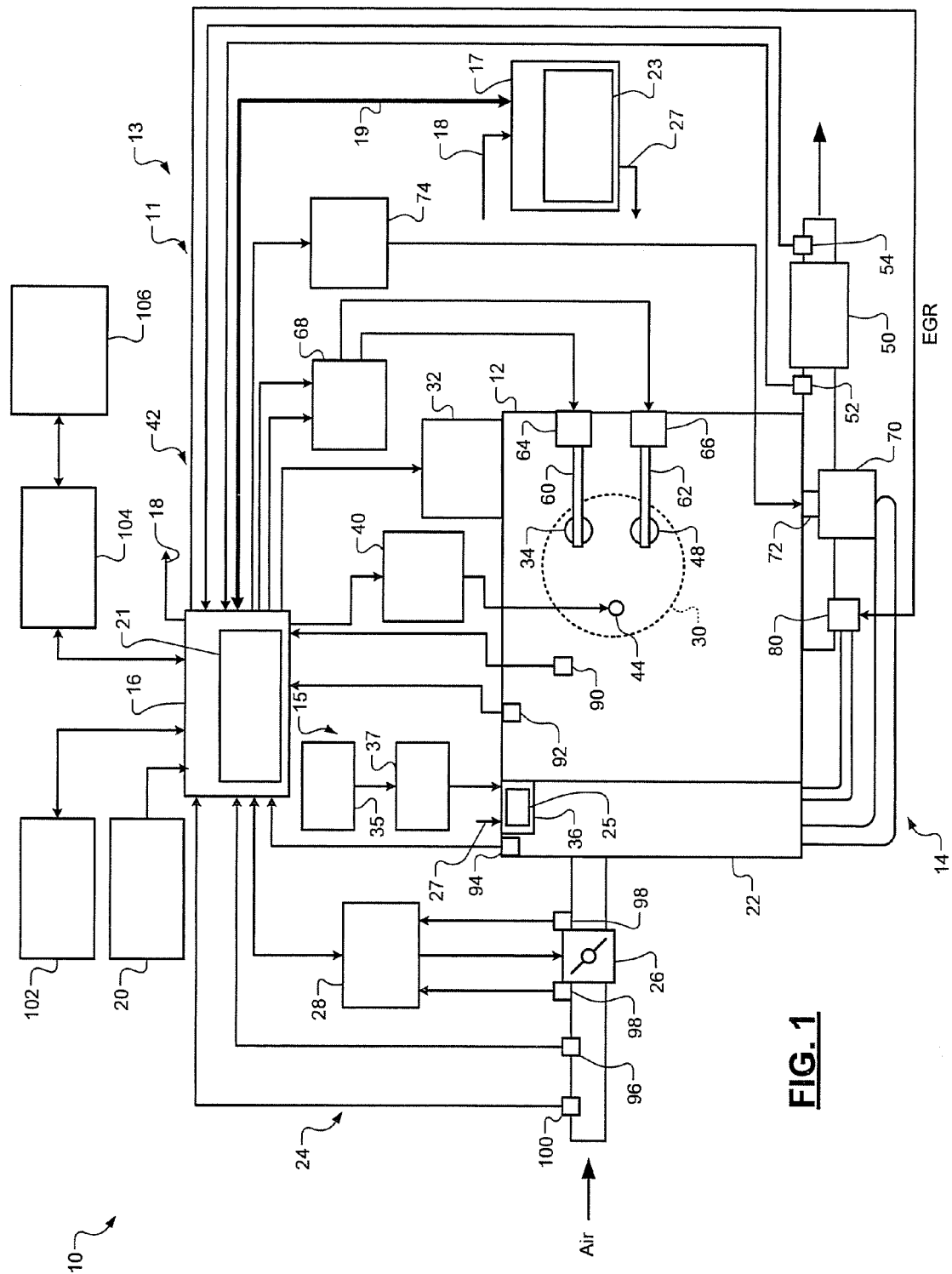
FIG. 1 is a functional block diagram of an engine control system incorporating a fuel injector and diagnostic system in accordance with the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A fuel injector control system for a bi-fuel supply system (e.g., vehicle with two different fuel sources, such as liquid and gaseous fuel sources (i.e. fuel sources that are in liquid and gaseous states when injected into a cylinder of an engine). A liquid fuel source may refer to gasoline, E0 (i.e. approximately 100% gasoline or petrol), E85 (i.e. approximately 15% ethanol and 85% gasoline or petrol) or other liquid fuel source, such as diesel fuel. Example gaseous fuel sources are liquefied petroleum gas (LPG) and compressed natural gas (CNG). Alternative fuel sources may refer to fuel sources other than gasoline or E0.

The fuel injector control system may include an engine control module (ECM) and a fuel injector control module (FICM). The ECM generates fuel injector command signals. The FICM includes a bi-fuel engine control system. The bi-fuel engine control system receives the fuel injector command signals and generates compensated fuel injector command signals, which are provided to respective secondary (gaseous) fuel injectors. The bi-fuel engine control system may provide the fuel injector command signals to respective liquid (gasoline) fuel injectors when gasoline is used. The bi-fuel engine control system may provide the compensated fuel injector command signals when a gaseous fuel is used.

In a first type of fuel injector control system, the ECM may not be aware of the FICM. In other words, the ECM does not monitor, have stored information, and/or receive information that indicates to the ECM presence of the FICM. The ECM is not aware that the FICM controls engine operation using a gaseous fuel source, and/or the presence of a gaseous fuel engine control system. The FICM attempts to remove and/or compensate for the gasoline open loop and transient fuel corrections to maintain proper fuel control when operating an engine on the gaseous fuel source.

The first type of fuel injector control system has associated disadvantages, one of which being absence or lack of communication between the ECM and the FICM. Absence of communication between the ECM and the FICM can lead to an inaccurate estimation of an ECM intended 'combustible fuel mass' by the FICM. This inaccurate estimation can lead to fuel consumption and torque calculation errors within the ECM. In the following disclosure, other types of fuel injector control systems are provided in which ECMs are aware of and communicate with FICMs.

Emissions and on-board diagnostic (OBD) regulations are ever becoming more stringent. Fuel injection, diagnostic and engine control systems are disclosed below that include increased ECM and FICM communication. This communication allows for decreased emissions and improved diagnostic capabilities of an engine control system. The tasks and functions of the fuel injection, diagnostic and engine control systems disclosed herein may be shared by an ECM and a FICM, performed primarily by the ECM, performed primarily by the FICM, and/or performed both by the ECM and by the FICM (providing duplication for effective use of control modules and quick response times). The fuel injection, diagnostic and engine control systems enable gaseous fuel modules, control modules, and/or subsystems to be integrated while meeting emission and diagnostic regulation requirements.

In FIG. 1, a first portion 10 of an engine control system is shown incorporating a fuel injector and diagnostic system 11 (referred to as a fuel delivery control system). The engine control system includes an engine 12, an exhaust system 14 and an engine control module (ECM) 16. The fuel injector and diagnostic control system 11 includes the ECM 16 and a FICM 17. The ECM 16 and the FICM 17 communicate with each other via serial and/or parallel connections and/or via a controller area network (CAN) 19 (or other network with a suitable serial data communications protocol). Engine control system functions are distributed between the ECM 16 and the FICM 17. An example serial connection is shown for a fuel injector command signal FUEL 18 in FIG. 1. This communication is described and shown in more detail in the following description and described Figures.

Figure 2:
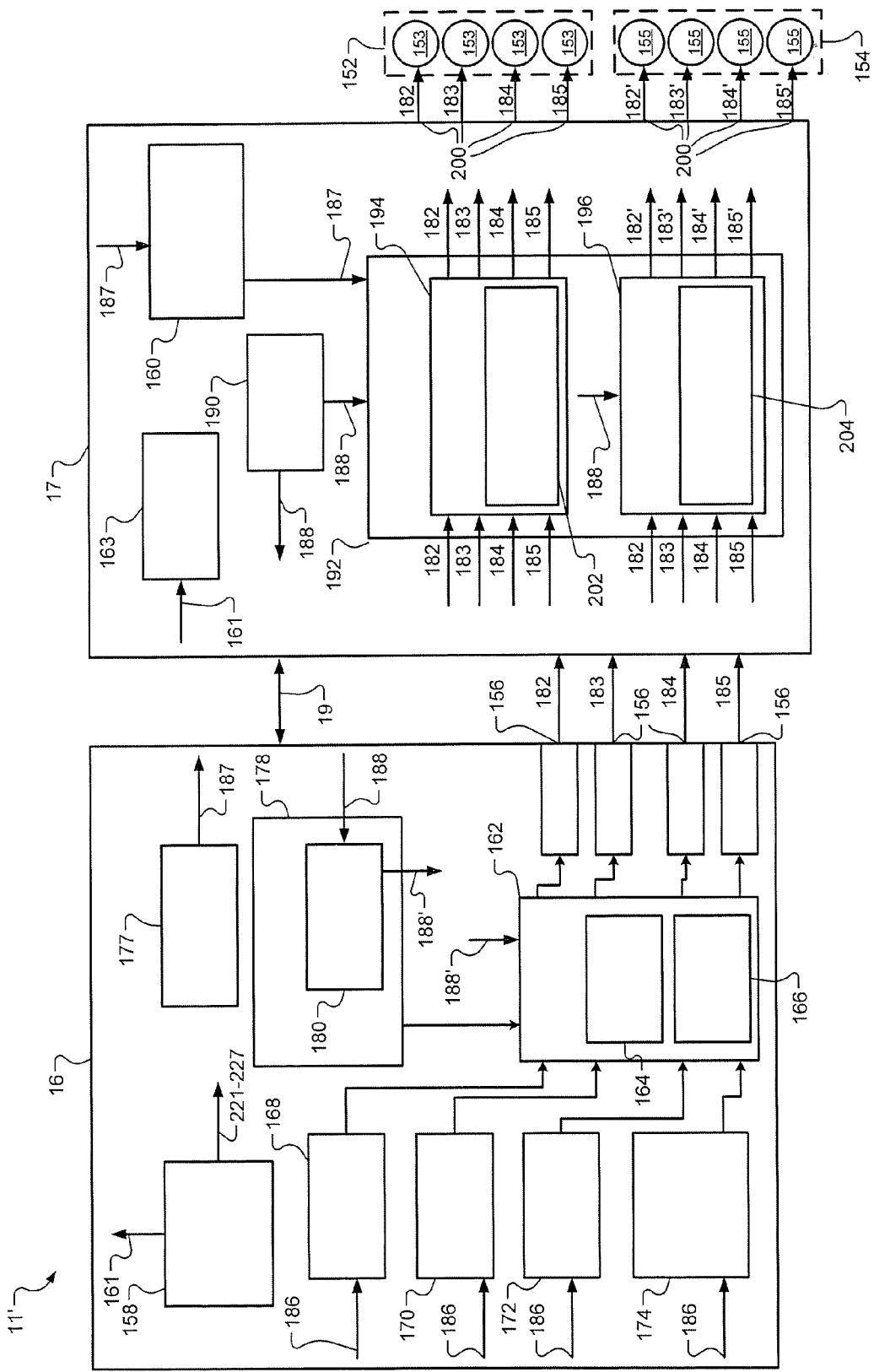
FIG. 2 is a functional block diagram of a first portion of the fuel injector and diagnostic system in accordance with the present disclosure.
Figure 3:
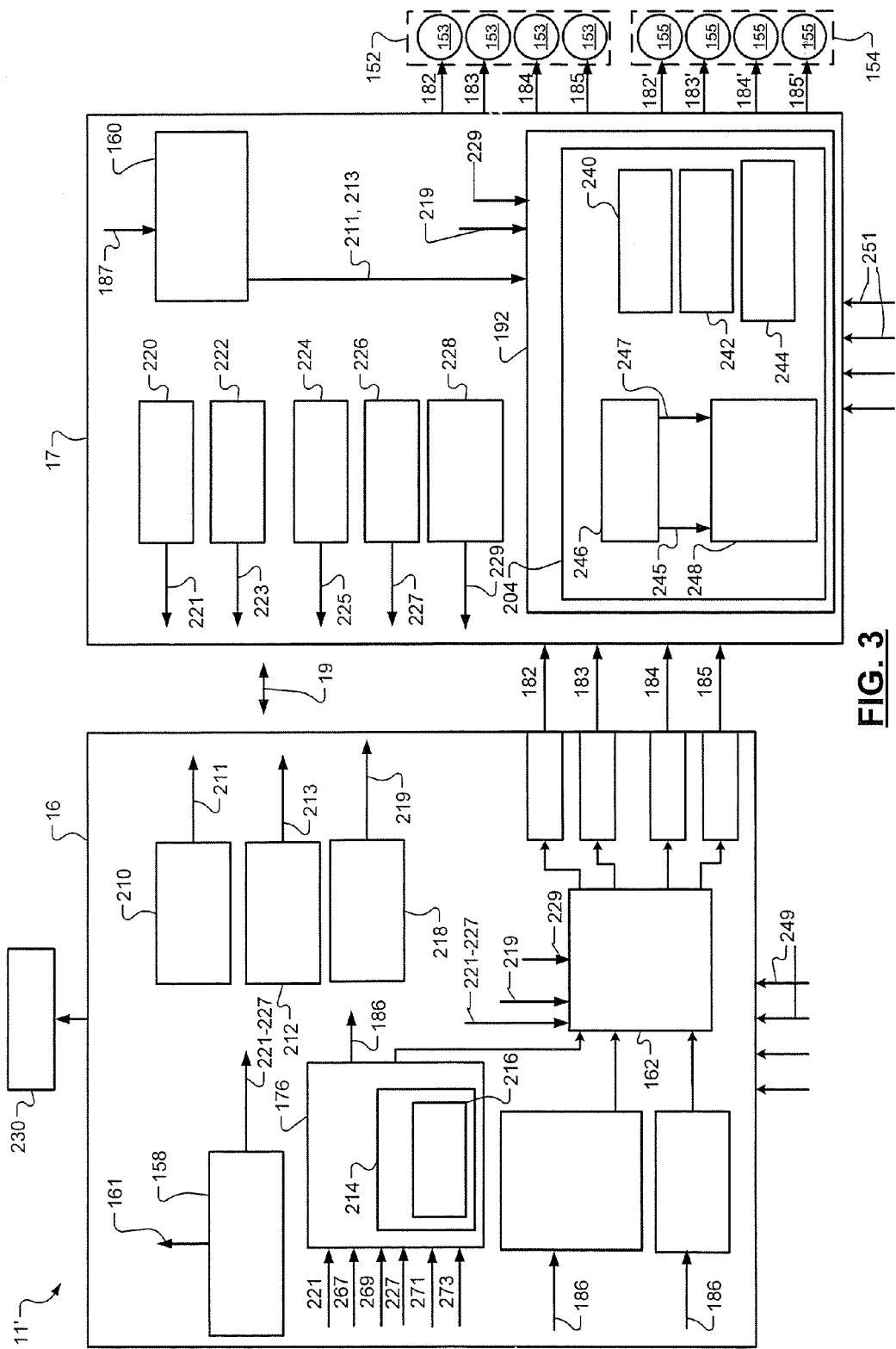
FIG. 3 is a functional block diagram of a second portion of the fuel injector and diagnostic system in accordance with the present disclosure.
Figure 4:
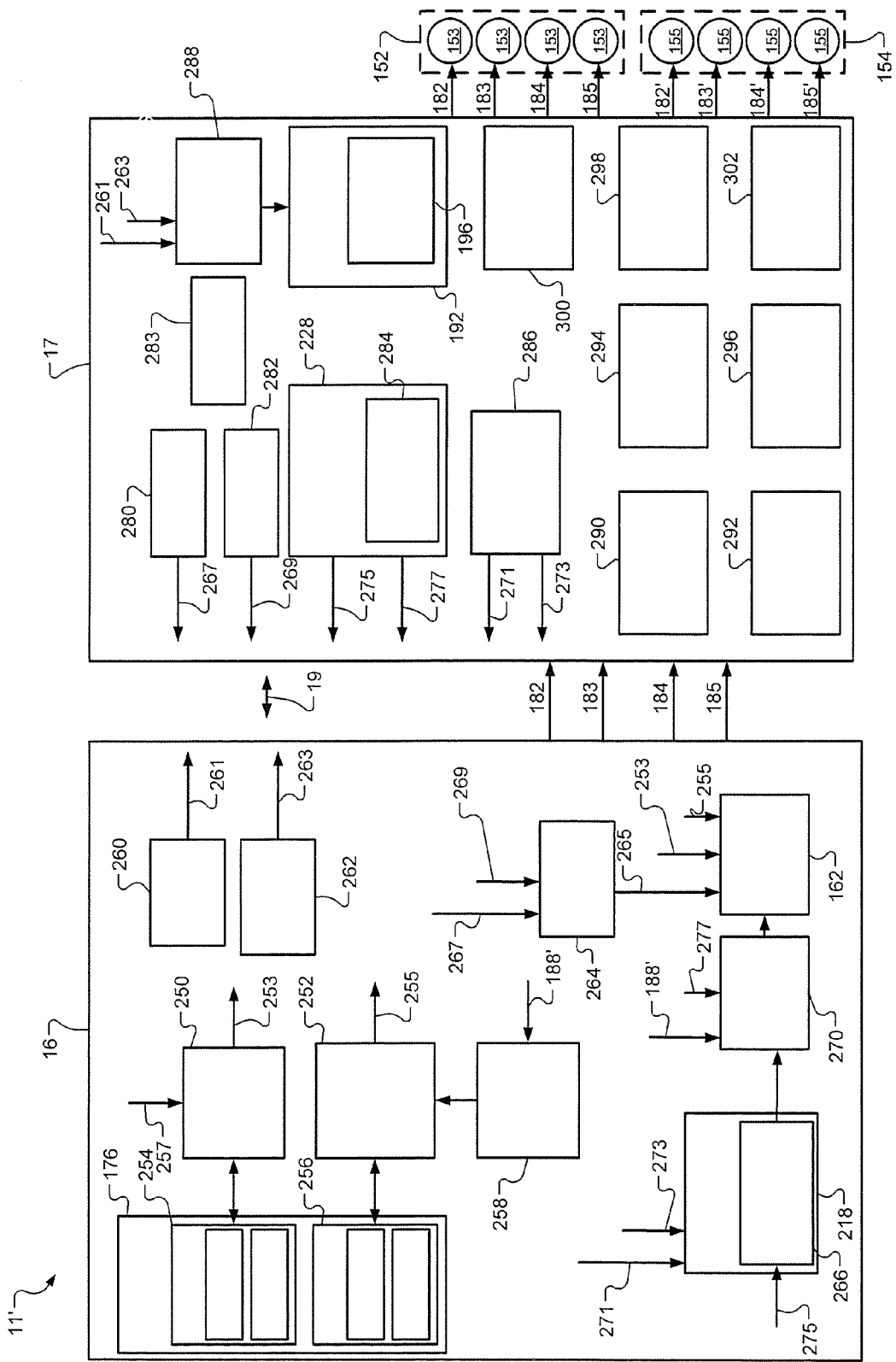
FIG. 4 is a functional block diagram of a third portion of the fuel injector and diagnostic system in accordance with the present disclosure.
Figure 5:
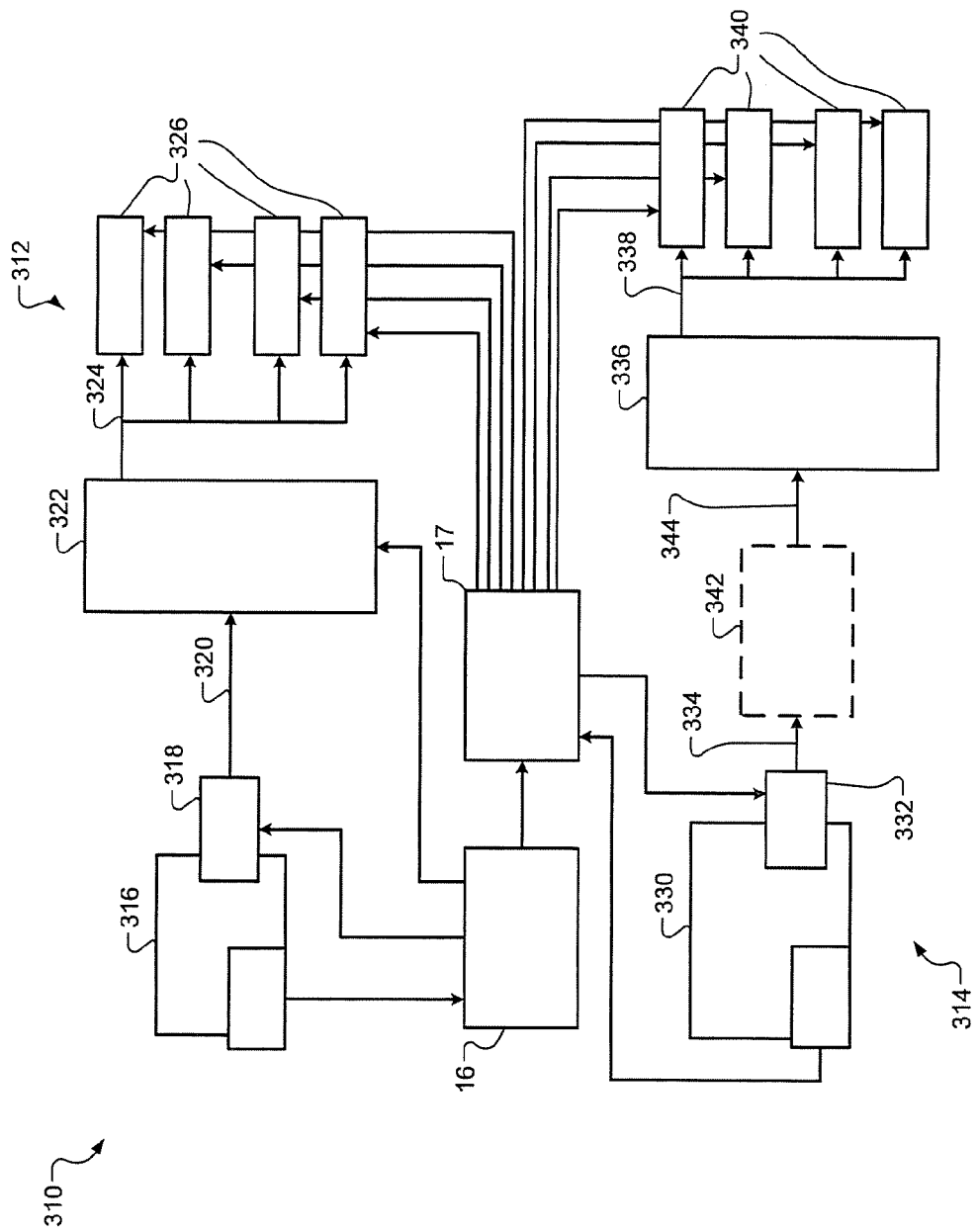
FIG. 5 is a function block diagram of a bi-fuel source delivery system in accordance with the present disclosure.

The fuel injector and diagnostic control system 11 may be a bi-fuel source system and may operate in mono-fuel and bi-fuel modes. An example of a bi-fuel source delivery system is shown in FIG. 5. The bi-fuel modes include a first fuel source (liquid) mode and in a second fuel source (gaseous) mode. The ECM 16 and the FICM 17 control injection of fuel into the engine 12. The FICM 17 is connected between the ECM 16 and the engine 12. The FICM 17 adjusts the fuel injector command signal FUEL 18 when the fuel being received by the engine 12 is a gaseous fuel. The FICM 17 generates a compensated fuel injector command signal FUEL' 27, which is provided to a respective fuel injector (fuel injectors are collectively identified as 25 in FIG. 1) of the fuel injector and diagnostic control system 11. The ECM 16 and the FICM 17 include fuel injector and diagnostic modules 21, 23. Examples of the fuel injection and diagnostic modules 21, 23 are shown in FIGS. 2-4.

The fuel injection and diagnostic system 11 may, for example, diagnose errors and detect faults associated with components of the engine 12, the exhaust system 14 and a fuel delivery (supply) system 15. An error may refer to, for example, a sensor signal that indicates improper operation with a corresponding sensor and/or with another component of an engine control system. An error may exist when a characteristic of the sensor signal exceeds a threshold. Sensor signal characteristics may include frequency, rich and lean state durations, amplitudes, etc. These sensor signal characteristics and others are described below.

A fault may refer to an identification of when a component is operating improperly. A component may not be faulty although an error is associated with the component. For example, a sensor signal generated by a sensor may indicate that an error is associated with that sensor. The error may be a FALSE indication of a fault with the sensor. The error may be generated due to a fault associated with other component(s).

As another example, an oxygen ($O_2$) sensor may generate an $O_2$ signal that indicates that the $O_2$ sensor is operating improperly. This may be a TRUE or FALSE indication of a fault with the $O_2$ sensor. The $O_2$ sensor may not be faulty (operating improperly), for example, when a catalytic converter or other $O_2$ sensor is faulty. This is described in further detail below.

The engine 12 combusts an air/fuel mixture to produce drive torque for a vehicle based on a driver input module 20. While a spark ignition, bi-fuel type engine is described herein, the present disclosure is applicable to other types of torque producers, not limited to gasoline type engines, gaseous fuel type engines, diesel type engines, propane type engines, and hybrid type engines.

Air is drawn into an intake manifold 22 of a throttle control system 24 of the engine 12 through a throttle valve 26. The ECM 16 commands a throttle actuator module 28 to regulate opening of the throttle valve 26 to control the amount of air drawn into the intake manifold 22. Air from the intake manifold 22 is drawn into cylinders of the engine 12. While the engine 12 may include multiple cylinders, for illustration purposes, a single representative cylinder 30 is shown. The ECM 16 may instruct a cylinder actuator module 32 to selectively deactivate some of the cylinders to improve fuel economy.

Air from the intake manifold 22 is drawn into the cylinder 30 through an intake valve 34. The ECM 16 and the FICM 17 control the amount of fuel injected by the fuel injectors 25. The fuel injector and diagnostic control system 11 may inject fuel into the intake manifold 22 at a central location or may inject fuel into the intake manifold 22 at multiple locations, such as near the intake valve of each of the cylinders. Alternatively, the fuel injection system 11 may inject fuel directly into the cylinders.

The fuel injector and diagnostic control system 11 (referred to as a distributed fuel delivery system) includes the fuel supply system 15, which may be a bi-fuel delivery system. The fuel supply system 15 may include multiple fuel sources 35 and fuel actuators 37. An example of a bi-fuel delivery system is shown in FIG. 5 and includes a liquid fuel delivery system and a gaseous fuel delivery system.

The injected fuel mixes with the air and creates the air/fuel mixture in the cylinder 30. A piston (not shown) within the cylinder 30 compresses the air/fuel mixture. Based upon a signal from the ECM 16, a spark actuator module 40 of an ignition system 42 energizes a spark plug 44 in the cylinder 30, which ignites the air/fuel mixture. Spark timing may be specified relative to the time when the piston is at its topmost position, referred to as to top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 48. The byproducts of combustion are exhausted from the vehicle via the exhaust system 14.

The exhaust system 14 includes a catalytic converter 50, a pre-converter (primary) $O_2$ sensor 52, and a post-converter (secondary) $O_2$ sensor 54. The pre-converter $O_2$ sensor 52 is located upstream (with respect to the exhaust) of the catalytic converter 50 between the exhaust manifold and the catalytic converter. The post-converter $O_2$ sensor 54 is located downstream of the catalytic converter 50.

The catalytic converter 50 controls emissions by increasing the rate of oxidization of hydrocarbons (HC) and carbon monoxide (CO) and the rate of reduction of nitrogen oxides ($NO_x$). To enable oxidization, the catalytic converter 50 requires $O_2$. The $O_2$ storage capacity of the catalytic converter 50 is indicative of catalytic converter efficiency in oxidizing the HC and CO and catalytic converter ability in reducing $NO_x$.

The pre-converter $O_2$ sensor 52 communicates with the ECM 16 and measures the $O_2$ content of the exhaust stream entering the catalytic converter 50. The post-converter $O_2$ sensor 54 communicates with the ECM 16 and measures the $O_2$ content of the exhaust stream exiting the catalytic converter 50. The primary and secondary $O_2$ signals are indicative of $O_2$ levels in the exhaust system 14 before and after the catalytic converter 50. The $O_2$ sensors 52, 54 generate respective primary and secondary $O_2$ signals that are feedback to the ECM 16 for closed loop control of air/fuel ratio(s). The ECM 16 may perform closed loop control based on the $O_2$ sensor signals from the $O_2$ sensors, 52, 54 and/or $O_2$ bias and offset signals from the FICM 17. The $O_2$ bias and offset signals may be received via the CAN 19.

As one example, the primary and secondary $O_2$ signals may be weighted and a commanded air/fuel ratio is generated based, for example, 80% on the primary $O_2$ signal and 20% on the secondary $O_2$ signal. As another example, the secondary $O_2$ signal is used to adjust a commanded air/fuel ratio that is generated based on the primary $O_2$ signal. The primary $O_2$ signal may be used for rough adjustment of an air/fuel ratio and the secondary $O_2$ signal may be used for fine adjustment of the air/fuel ratio. The ECM 16 adjusts fuel injector command signals based on the primary and secondary $O_2$ signals. The ECM 16 adjusts throttle position, spark, fuel, etc. to regulate engine torque. The ECM 16 regulates air/fuel ratio by adjusting the injected fuel quantity based on mass air flow (MAF) and $O_2$ sensor feedback via primary and secondary $O_2$ signals.

The ECM 16 monitors the primary and secondary $O_2$ signals and determines when there is an error and/or fault associated with the catalytic converter 50 and/or one or more of the $O_2$ sensors 2, 54. Performance diagnostics are performed on the $O_2$ sensors 2, 54 to determine whether the sensors are working properly. For example, the monitoring effectiveness of the catalytic converter efficiency may be decreased when one or more of the $O_2$ sensors 2, 54 are not functioning properly. The ECM 16 may compensate for the error(s) and/or fault(s) detected. This compensation may be implemented when regulating the air/fuel ratio(s) of the engine 12.

The intake valve 34 may be controlled by an intake camshaft 60, while the exhaust valve 48 may be controlled by an exhaust camshaft 62. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 32 may deactivate cylinders by halting provision of fuel and/or spark and/or by disabling respective exhaust and/or intake valves.

The time at which the intake valve 34 is opened may be varied with respect to piston TDC by an intake cam phaser 64. The time at which the exhaust valve 48 is opened may be varied with respect to piston TDC by an exhaust cam phaser 66. A phaser actuator module 68 controls the phasers 64, 66 based on signals from the ECM 16.

The engine control system may include a boost device that provides pressurized air to the intake manifold 22. For example, FIG. 1 depicts a turbocharger 70. The turbocharger 70 is powered by exhaust gases flowing through the exhaust system 14, and provides a compressed air charge to the intake manifold 22. The air used to produce the compressed air charge may be taken from the intake manifold 22.

A wastegate 72 may allow exhaust gas to bypass the turbocharger 70, thereby reducing the turbocharger's output (or boost). The ECM 16 controls the turbocharger 70 via a boost actuator module 74. The boost actuator module 74 may modulate the boost of the turbocharger 70 by controlling the position of the wastegate 72. The compressed air charge is provided to the intake manifold 22 by the turbocharger 70. An intercooler (not shown) may dissipate some of the compressed air charge heat, which is generated when air is compressed and may also be increased by proximity to the exhaust system 14. Alternate engine systems may include a supercharger that provides compressed air to the intake manifold 22 and is driven by the crankshaft.

The engine control system may include an exhaust gas recirculation (EGR) valve 80, which selectively redirects exhaust gas back to the intake manifold 22. In various implementations, the EGR valve 80 may be located after the turbocharger 70. The engine control system may measure the speed of the crankshaft in revolutions per minute (RPM) using an RPM sensor 90. The temperature of the engine coolant may be measured using an engine coolant temperature (ECT) sensor 92. The ECT sensor 92 may be located within the engine 12 or at other locations where the coolant is circulated, such as a radiator (not shown).

The pressure within the intake manifold 22 may be measured using a manifold absolute pressure (MAP) sensor 94. In various implementations, engine vacuum may be measured, where engine vacuum is the difference between ambient air pressure and the pressure within the intake manifold 22. The mass of air flowing into the intake manifold 22 may be measured using a mass air flow (MAF) sensor 96. Under certain operating conditions, the mass of air flowing into the cylinder may be estimated based on input from other sensors (e.g. MAP, ECT, engine speed). In various implementations, the MAF sensor 96 may be located in a housing with the throttle valve 26. The ECM 16 determines cylinder fresh air charge primarily from the MAF sensor and calculates a desired fuel mass using open loop, closed loop and transient fueling algorithms. Fuel injector characterization functions convert the desired fuel mass into an injector on time, which is executed by fuel injector outputs of the ECM 16.

The throttle actuator module 28 may monitor the position of the throttle valve 26 using one or more throttle position sensors (TPS) 98. The ambient temperature of air being drawn into the engine control system may be measured using an intake air temperature (IAT) sensor 100. The ECM 16 may use signals from the sensors disclosed herein to make control decisions for the engine control system.

The ECM 16 may communicate with a transmission control module 102 to coordinate shifting gears in a transmission (not shown). For example, the ECM 16 may reduce torque during a gear shift. The ECM 16 may communicate with a hybrid control module 104 to coordinate operation of the engine 12 and an electric motor 106. The electric motor 106 may also function as a generator, and may be used to produce electrical energy for use by vehicle electrical systems and/or for storage in a battery. In various implementations, the ECM 16, the transmission control module 102, and the hybrid control module 104 may be integrated into one or more modules.

To abstractly refer to the various control mechanisms of the engine 12, each system that varies an engine parameter may be referred to as an actuator. For example, the throttle actuator module 28 can change the blade position, and therefore the opening area, of the throttle valve 26. The throttle actuator module 28 can therefore be referred to as an actuator, and the throttle opening area can be referred to as an actuator position.

Similarly, the spark actuator module 40 can be referred to as an actuator, while the corresponding actuator position is amount of spark advance. Other actuators include the boost actuator module 74, the EGR valve 80, the phaser actuator module 68, the fuel injection system 36, and the cylinder actuator module 32. The term actuator position with respect to these actuators may correspond to boost pressure, EGR valve opening, intake and exhaust cam phaser angles, air/fuel ratio, and number of cylinders activated, respectively.

In the following Figures various signals are described. Names of some of the signals and corresponding acronyms are provided in tables 1 and 2 along with the control module or platform (PLT) that generates the signals.

TABLE 1

| Signal Name | Transmitter |
| --- | --- |
| Fuel mode switch active validity (FMSAV) | Platform (PLT) from Body control module (BCM) |
| Fuel mode switch active (FMSA) | PLT |
| Fuel pump enabled discrete output commanded status (FPEDOCS) | ECM |
| Powertrain crank active (PCA) | ECM |
| Engine idle active (EIA) | ECM |
| Engine manifold absolute pressure validity (EMAPV) | ECM |
| Engine manifold absolute pressure (EMAP) | ECM |
| Engine air boost pressure validity (EABPV) | ECM |
| Engine air boost pressure (EABP) | ECM |
| Throttle position validity (TPV) | ECM |
| Throttle position (TP) | ECM |
| Accelerator effective position (AEP) | ECM |
| Vehicle speed average driven validity (VSADV) | ECM |
| Vehicle speed average driven (VSAD) | ECM |
| Vehicle speed average driven source (VSADS) | ECM |
| Commanded air fuel ratio (CAFR) | ECM |
| Engine fuel control state (EFCS) | ECM |
| Mass air flow (MAF) | ECM |
| Mass air flow validity (MAFV) | ECM |
| Instantaneous fuel flow estimate (IFFE) | ECM |
| Fuel control system fault present (FCSFP) | ECM |
| Engine speed status (ESS) | ECM |
| Engine speed (ES) | ECM |
| Barometric pressure absolute validity (BPAV) | ECM |
| Barometric pressure absolute (BPA) | ECM |
| Engine coolant temperature validity (ECTV) | ECM |
| Engine coolant temperature (ECT) | ECM |
| Engine intake air temperature validity (EIATV) | ECM |
| Engine intake air temperature (EIAT) | ECM |
| Outside air temperature powertrain estimated (OATPE) | ECM |
| Outside air temperature powertrain estimated validity (OATPEV) | ECM |
| Outside air temperature powertrain estimated mask (OATPEM) | ECM |
| Emissions related fuel level low (ERFLL) | ECM |

TABLE 1-continued

| Signal Name | Transmitter |
|---|---|
| Fuel level emissions related status (FLERS) | ECM |
| Fuel level percent (FLP) | ECM |
| Fuel level percent validity (FLPV) | ECM |
| Fuel alcohol composition (FAC) | ECM |
| Fuel alcohol composition validity (FACV) | ECM |
| Engine injector enabled A (EIEA) | ECM |
| Engine injector enabled B (EIEB) | ECM |
| Engine injector enabled C (EIEC) | ECM |
| Engine injector enabled D (EIED) | ECM |
| Engine 12 volt starter motor commanded ON (EVSMCO) | ECM |
| Engine distributed fuel mode defaulted (EDFMD) | ECM |
| Fuel mode status (FMS) | FICM |
| Alternative (gaseous) fuel pre-heating active (AFPA) | FICM |
| Alternative fuel equivalence ratio bias offset (AFERBO) | FICM |
| Alternative fuel post O$_2$ bias offset (AFPOBO) | FICM |
| Alternative fuel injector flow offset (AFIFO) | FICM |
| Alternative fuel injector opening offset (AFIOO) | FICM |
| Alternative fuel injector min pulse offset (AFIMPO) | FICM |
| Alternative fuel lean fuel trim limit offset (AFLFTLO) | FICM |
| Alternative fuel rich fuel trim limit offset (AFRFTLO) | FICM |
| Fuel injector control module fuel delivery fault active (FICMFDFA) | FICM |
| Fuel injector control module injection fault active (FICMIFA) | FICM |

The signals of table 1 may be transmitted via the CAN 19 between then the ECM 16 and the FICM 17 and/or between one of the ECM 16 and the FICM 17 and another vehicle control module. The signals of table 2, other than the ECM fuel injector signals, are hardwired input signals provided to the FICM.

TABLE 2

| Signal Name | Transmitter |
|---|---|
| Vehicle HS vehicle LAN bus (VHGB) | ECM, FICM, Platform |
| Run/crank relay output (RCRO) | ECM, FICM, Platform |
| Accessory | ECM, FICM, Platform |
| Fuel pump enable discrete (FPED) | ECM, FICM |
| ECM fuel injector signals | ECM |

Other vehicle control modules may communicate via the CAN 19 and may be referred to as PLT-based control modules. The PLT-based control modules may be non-powertrain control modules. An example of a PLT control module is a body control module (BCM). Certain signals may be generated by multiple modules.

CAN messages may be transmitted via a powertrain platform electrical interface (PPEI) and/or a powertrain electrical interface (PTEI). The PPEI refers to a database of CAN messages between powertrain control modules (e.g., the ECM 16 and the FICM 17) and non-powertrain control modules or a platform (e.g. BCM). The PTEI refers to a database of CAN messages between powertrain control modules.

In FIGS. 2-4, a fuel injector and diagnostic system 11' (referred to as a fuel delivery control system) is shown. The fuel injector and diagnostic system 11' includes the ECM 16, the FICM 17 and sets of fuel injectors 152, 154. Each of the sets of fuel injectors 152, 154 is associated with a particular fuel source and includes fuel injectors 153, 155. The ECM 16 communicates with the FICM 17 via the CAN 19, fuel injector outputs 156 and the fuel pump enable discrete hardware signal (e.g., the FPED signal and/or the FPEDOCS signal 263 described below). The CAN 19 includes serial data communication. The fuel injector outputs 156 transmit fuel injector command signals 182-185 from the ECM 16 to the FICM 17. Although the fuel injector and diagnostic system 11' is shown with respect to a 4-cylinder engine application, the fuel injector and diagnostic system 11' may be modified for an engine with any number of cylinders.

Referring now to FIG. 2, the ECM 16 includes modules that generate signals that are transmitted to the FICM 17 and modules that receive signals from the FICM 17. Similarly, the FICM 17 includes modules that generate signals that are transmitted to the ECM 16 and modules that receive signals from the ECM 16. Each module of the ECM 16 may have a corresponding counterpart module in the FICM 17 and vice versa. This is generally shown by other FICM counterpart reception modules 158 of the ECM 16 and other ECM counterpart reception modules 163 of the FICM 17.

The FICM 17 may, for example, receive from the ECM 16 signals in the above table and/or any of the following ECM engine parameter signals (collectively referred to as 161): engine 12 volt starter motor commanded ON, powertrain crank active, engine idle active, engine manifold absolute pressure validity, engine manifold absolute pressure, engine air boost pressure validity, engine air boost pressure, throttle position validity, throttle position, accelerator effective position, commanded air fuel ratio, engine fuel control state, mass air flow, vehicle speed average driven validity, vehicle speed average driven, vehicle speed average driven source, commanded air fuel ratio, engine fuel control state, mass air flow, mass air flow validity, instantaneous fuel flow estimate, fuel control system fault present, engine speed status, engine speed, barometric pressure absolute validity, barometric pressure absolute, engine coolant temperature validity, engine coolant temperature, engine intake air temperature validity, engine intake air temperature, outside air temperature powertrain estimated validity, outside air temperature powertrain estimated mask, and outside air temperature powertrain estimated. The ECM 16 may include modules 158 for the generation of each of the above signals. The FICM 17 may include modules 163 for the reception of each of the above signals.

The ECM 16 includes a first fuel injection module 162 that generates the fuel injector command signals 182-185 that are provided respectively to fuel injector drivers 1-4. Although four fuel injector drivers are shown, the present disclosure may be applied to any number of fuel injector drivers and corresponding fuel injectors. The first fuel injection module 162 includes a first fuel source module 164 (e.g., first liquid fuel module) and a second fuel source module 166 (e.g., first gaseous fuel module). The first and second fuel source modules 164, 166 generate the fuel injector command signals 182-185 based on signals from, for example, a MAF module 168, an open loop air/fuel (NF) ratio module 170, a closed loop fuel (trim) module 172, and an open loop transient fuel adjustment module 174. The modules 168-174 may generate respective output signals (e.g., EMAP, CAFR, FAC, etc.) that are provided to the first fuel injection module 162 based on calibration signals CAL 186. The calibration signals CAL 186 are generated by a calibration module 176 (shown in FIG. 3). The ECM 16 may further include other FICM signal transmit modules 177 (i.e. modules that generate signals 187, which are transmitted to the FICM 17), as disclosed below.

The closed loop fuel module 172 may generate a gain signal based on calibration signals from the calibration module 176 and gain signals from the adaptation modules 250, 252. The first fuel module 162 may generate fuel command signals based on the gain signal from the closed loop fuel module 172. The modules 172, 250 and 252 may be combined into a single module.

The ECM 16 may include other modules 178 (some of which are disclosed below) that provide signals to the first fuel injection module 162. For example, the ECM 16 may include a fuel mode determination module 180 that receives a fuel mode selection signal MODE 188, which indicates the fuel mode or fuel source being used (e.g., liquid or gaseous fuel). The fuel mode selection signal MODE 188 may also indicate other fuel source information, such as type of fuel, state of fuel source, etc. The fuel mode determination module 180 generates a fuel mode signal MODE' 188' based on the fuel mode selection signal MODE 188. The ECM 16 may use the fuel mode signal MODE' 188' when performing crank, cold start emission, spark and protection fueling functions, in addition to when performing functions in modules 170-174. The fuel mode signal MODE' 188' is used for open loop A/F ratio, transient fuel and closed loop functions. The first fuel injection module 162 may select one of the first and second fuel source modules 164, 166 based on the fuel mode signal MODE' 188'.

The fuel mode selection signal MODE 188 is relayed to the first fuel injection module 162 as the fuel mode signal MODE' 188' or may be modified such that correct synchronization of fuel mode is achieved between the ECM 16 and FICM 17. The fuel mode determination module 180 may determine when a transition between the liquid and gaseous fuel modes is to be performed based on the fuel mode signal MODE 188. The ECM 16 is a slave to the FICM fuel mode signal. When the fuel mode signal from the FICM 17 changes state, then the ECM 16 is obliged to perform a fuel mode change, such that both FICM 17 and ECM 16 are synchronized at some predetermined point following the mode transition (e.g. next time Cylinder 1 is injected+some number of engine cycles).

The FICM 17 includes a fuel mode selection module 190, a second fuel injection module 192 with a third fuel source module 194 (e.g., second liquid fuel module) and a fourth fuel source module 196 (e.g., second gaseous fuel module). The fuel mode selection module 190 generates the fuel mode signal MODE 188 sent to the ECM 16 and determines the selected fuel source. The third fuel source module 194 receives and transmits the fuel injector command signals 182-185. The fuel injector command signals 182-185 transmitted may be similar to or the same as the fuel injector command signals received. The fuel injector command signals 182-185 may be primary (e.g., gasoline) fuel injector command signals. The fourth fuel source module 196 receives the fuel injector command signals 182-185 and generates fuel injector command signals 182'-185'. The fuel injector command signals 182'-185' may be secondary (e.g., gaseous) fuel injector command signals. The fuel injector command signals 182-185 are modified to generate the fuel injector command signals 182'-185'.

Closed Loop Fuel Biasing

The gaseous closed-loop fuel control (i.e. fuel trims) and the lambda bias may be handled by the ECM 16. Relative air/fuel ratio bias for emissions control is fuel source dependant. Fuel control parameters for liquid (e.g. gasoline) fuel may cause lean shifts if used when operating on gaseous fuels. $O_2$ sensor response at stoichiometry is affected by higher hydrogen content in the exhaust feed-stream with gaseous fuels that have a greater H/C ratio than typical liquid fuels. The FICM 17 provides the alternative fuel equivalence ratio bias offset and alternative fuel post $O_2$ bias offset signals. The ECM 16 applies these offsets when indicated by the fuel mode signal MODE.

The alternative fuel equivalence ratio bias offset reflects an adjustment to the equivalence ratio (i.e. inverse of 'lambda') set point applied to the 'base' primary fuel bias of the ECM 16 at current operating conditions. The alternative fuel post $O_2$ bias offset reflects an adjustment (offset) to the 'base' target primary fuel post $O_2$ voltage (or window) of the ECM 16 for the current operating conditions. These signals provide offsets to the base primary fuel ECM control parameters to allow for full-range emissions control provided by the ECM 16.

The alternative fuel equivalence ratio bias offset reflects an adjustment (offset) in an equivalence ratio set point in addition to the 'base' fuel bias of the ECM 16 at current operating conditions. The alternative fuel post $O_2$ bias offset reflects an adjustment (offset) to the 'base' target post $O_2$ voltage (or window) of the ECM 16 for the current operating conditions. The ECM 16 applies these offsets when indicated by the fuel mode signal MODE. Requests from the FICM 17 may be constrained by the ECM 16 when the bias offset signals may saturate ECM closed loop control functions beyond attainable or diagnosable limits. This may occur, for example, when post $O_2$ target voltage adjustments are performed. The FICM 17 in gaseous fuel mode may define the lambda set point offset that is used for closed loop operation and submit this set point via the CAN 19 to the ECM 16.

Fuel Mode Transitions

Fuel mode transitions are coordinated between the ECM 16 and the FICM 17. The transition is made in the span of one or more than one multiple of a complete engine cycle. One engine cycle may refer to, for example, on a 4-stroke engine to two full rotations of the crankshaft or a cycle through intake, compression, ignition, and exhaust strokes of a cylinder. An engine cycle may not include spark. This is performed to correctly apply different fuel injector control, closed loop fuel biasing, and closed loop adaptation parameters when operating with the different fuel sources.

Once the fuel mode (status) signal MODE 188 from the FICM 17 changes state, the ECM 16 alters its fuel pulse calculations starting with the next injection event for a selected (transition) cylinder and continues for subsequent cylinders. See FIG. 7. The FICM 17 may initiate a fuel mode change upon the injector for the selected cylinder completing delivery of a fuel pulse. The ECM 16 accomplishes this by detecting the fuel mode change at a specific cylinder event that would most likely affect the fuel pulse calculations for the selected cylinder without affecting fuel pulses in progress for other cylinders. The ECM 16 alters fuel calculations for the selected (new) fuel mode to affect the next injection event for the selected cylinder when the fuel mode status changes state. At this point, subsequent fuel injection calculations are for the new fuel mode.

During a fuel mode transition, the FICM 17 may determine that a change in a fuel mode is desired and requests a new fuel mode by sending a fuel mode signal on the CAN. Once the FICM 17 sends out a new fuel mode (fuel mode change) request on the CAN, the FICM 17 delays actually transitioning to the new fuel control mode for a predetermined number of engine cycles (e.g. one engine cycle). After the predetermined number of engine cycles, the FICM 17 begins the new fuel control state at a predetermined engine cylinder (e.g. Cylinder A). In order to coordinate fuel control mode transitions between the FICM 17 and ECM 16 during transitions, the ECM 16 also delays transition of the fuel control mode of the ECM 16 for the same predetermined number of engine cycles after the reception of the new fuel mode request. The ECM 16 begins the new fuel control mode for the same predetermined engine cylinder (after the predetermined engine cycle delay). As a result, the fuel control mode may effectively change from one cylinder to the next.

Figure 7:
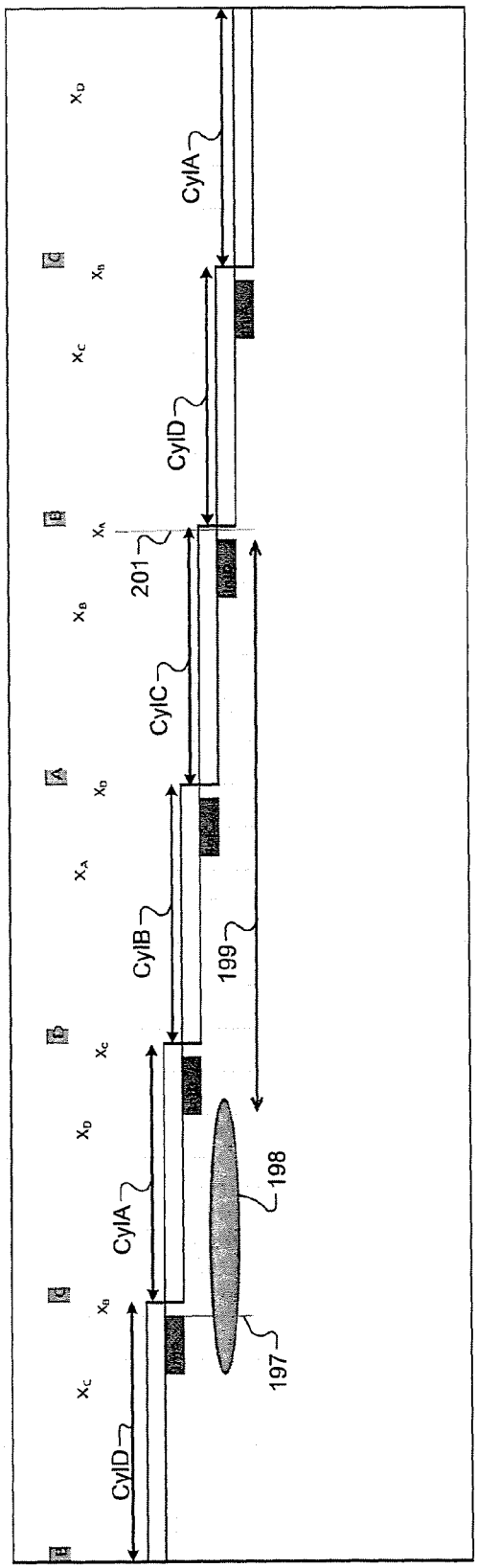
FIG. 7 is an exemplary plot of ECM and FICM transition mode timing for bi-fuel modes in accordance with the present disclosure.

In FIG. 7, an exemplary plot of ECM and FICM transition mode timing for bi-fuel modes is shown for sequential fuel injection. Top-dead-center of compression events for cylinders A-D are identified as A-D. Beginnings of each compression stroke for each of the cylinders A-D are identified as $X_A$-$X_D$. Ends of available fuel calculation periods for each of the cylinders A-D are identified with $x_A$-$x_D$. Although the ends of the fuel calculation periods are identified with $x_A$-$x_D$, fuel for one or more of the cylinders A-D may be calculated before each of the ends $x_A$-$x_D$. Fuel pulse calculations are updated for a current cylinder (e.g., cylinder A) and/or any other one of the cylinders (e.g., cylinders B-D) at or before the ends $x_A$-$x_D$. Fuel injection periods (windows) for each of the cylinders A-D are shaded and identified as InjA-D. Intake valves of cylinders A-D are open during respective open periods CylA-CylD.

A first vertical line 197 identifies an end time of a fuel injection period for cylinder A. Mode transition from one fuel mode to the other fuel mode is evaluated after the end time. In the example shown, the FICM 17 restricts fuel mode transitions to be evaluated when InjA pulse ends. This may occur before an intake valve of cylinder A opens (idle, steady state cruise conditions) up until when the intake valve of cylinder A closes (transient or high speed/load conditions).

An oval 198 identifies when FICM fuel mode status information (indicating a transition between liquid and gaseous fuel modes) is received by the ECM 16. The FICM 17 sends fuel mode status information to the ECM 16 with respect to an agreed upon cylinder (e.g., selected cylinder A) coordinated between the ECM 16 and the FICM 17.

Arrow 199 identifies delay time between when a transition request is generated and when transition can occur. This delay may be at least partially due to LAN signal delay. The ECM 16 receives the transition request before a transition time (time after an injection window of a previous cylinder (cylinder D) and before intake valve opening of the selected cylinder (cylinder A)) identified by a second vertical line 201. A transition occurs after the transition time. Fuel mode calculations are changed from a first mode to a second mode at the transition time. Fuel calculations for all of the cylinders A-D may occur after the transition time. For low engine speed, light load conditions, a latency of ~360+ degrees is available to allow the FICM 17 to transmit the fuel mode signal MODE 188 (i.e. signal a transition in fuel mode) via a LAN signal or CAN signal. This latency also allows for the ECM 16 to read and apply the updated fuel mode information to fueling calculations.

The ECM 16 transitions between fuel modes after the second vertical line 201. The ECM 16 performs fuel mode calculations for the updated fuel mode after the second vertical line 201.

ECM evaluates 'Fuel Mode' on LoresI events where CylID=B (update at LoresC events). Changing fuel mode calculations here gives highest likelihood that the ECM on the next InjA fuel pulse will recognize new fuel mode without InjD event (or others) being affected. In some cases, the fuel pulse for InjD may be extended, but it is unlikely to be truncated.

During some failure modes, the ECM 16 may default to providing fuel injector output signals for the primary (i.e. liquid) fuel system. This occurs when the ECM 16 has detected a lost FICM communication fault. When this occurs, the ECM 16 sets the engine distributed fuel mode defaulted signal to TRUE. This is done to allow the FICM 17 to detect the actions of the ECM 16 when the FICM 17 has not detected a lost ECM communication fault. Lost FICM and ECM communication faults may refer to, for example, when communication between the FICM 17 and the ECM 16 is interrupted, degraded and/or lost (signals dropped or not received).

The FICM 17 determines when fuel mode transitions are performed and/or permitted. The FICM 17 may not allow changes in the fuel mode selection signal MODE 188 to occur after the ECM 16 detects that the selected cylinder has completed delivery of a fuel pulse to coordinate with the fuel source transition method of the ECM 16.

Prior to initiating a fuel mode transition, the FICM 17 may enable/disable fuel shut-off solenoids to meet gaseous fuel system priming requirements. Consecutive fuel mode transitions may be delayed by the FICM 17 for at least a predetermined period (e.g., 10 seconds) to limit disturbances that are present during the transitions and certain operation modes.

The FICM 17 activates the primary fuel system when the ECM 16 sets the engine distributed fuel Mode defaulted signal to TRUE. As described herein, certain conditions may prevent the FICM 17 from making the fuel mode transition to the primary fuel mode. When these conditions occur, the FICM 17 adjusts gaseous fuel injection commands generated by the FICM 17 to account for primary fuel usage.

Fuel Injector Control

The FICM 17 and/or the second fuel injection module 192 have direct control over fuel injector outputs 200 to the fuel injectors 153, 155. The FICM 17 gates the injector output pulses of the ECM 16 to the liquid fuel injectors 152 when the liquid fuel system is active. The FICM 17 monitors the fuel injector command signals 182-185 from the ECM 16 to initiate fuel pulses and to calculate the appropriate gaseous fuel injection pulse width when the gaseous fuel source is active. The FICM 17 comprehends and/or adjusts the ECM 16 strategy of defining internal calibrations for gaseous fuel injector flow rates and opening time offsets. The FICM 17 transmits appropriate (i.e. non-zero) values for the alternative fuel injector flow offset, alternative fuel injector opening offset and alternative fuel injector minimum pulse offset signals when gaseous fuel system design changes occur after ECM calibrations are finalized. The FICM 17 may control gaseous fuel injection based on the injector command signals 182-185 from the ECM 16.

The fourth fuel source module 196 receives the fuel injector command signals 182-185 and generates fuel injector command signals 182'-185' (compensated fuel injector command signals). The fuel injector command signals 182'-185' may be different than the fuel injector command signals 182-185. The second fuel injector compensation module 204 modifies the fuel injector command signals 182-185 to generate the fuel injector command signals 182'-185'. The second fuel injector compensation module 204 is further shown in FIG. 3.

Referring now also to FIG. 3, the ECM 16 and the FICM 17 are shown. The ECM 16 may include a FLP/FLPV module 210 and a FAC/FACV module 212, which generate respective signals 211, 213. The calibration module 176 includes memory 214 with calibration values 216. Different calibration values may be stored for respective fuel sources, an example of which is shown in FIG. 4.

Diagnostics

The ECM 16 includes a first diagnostic module 218 that generates a first error and fault signal FAULT1 219, which is provided to the FICM 17. The ECM 16 and the FICM 17 may generate error and fault signals that are shared with each other. Any of the modules of the ECM 16 and the FICM 17 may operate based on the fault signals. For example, the first and second fuel injection modules 162, 192 may operate based on fault signals from the ECM 16 and/or the FICM 17.

The FICM 17 includes an AFIMPO module 220, an AFPA module 222, an AFIFO module 224, and an AFIOO module 226 that provide respective signals 221, 223, 225, 227 to the ECM 16. The FICM 17 further includes a second diagnostic module 228 that generates a second error and fault signal FAULT2 229, which is provided to the ECM 16. The second error and fault signal FAULT2 229 may be generated based on an error and/or fault associated with a gaseous fuel system, such as associated with a sensor, actuator, vaporizer, heater, solenoid, relay, etc. of the gaseous fuel system. An example gaseous fuel system is shown in FIG. 5. The ECM 16 may generate a malfunction indicator lamp (MIL) signal based on the first and/or second error and fault signals FAULT1 219, FAULT2 229. The MIL signal may be sent to a MIL 230.

The FICM 17 monitors the ECM fuel injector outputs 156 (fuel injector command signals 182-185) and determines when faults are present (i.e. open/short-hi/short-lo). To prevent the FICM 17 from falsely detecting faults on these outputs, the ECM 16 transmits engine injector enabled signals. These engine injector enable signals indicate when FICM diagnostics may be inhibited For example, diagnostics that detect when injector drivers are in an open or "shorted-hi" state may correctly identify faults when the engine injectors are enabled. Similarly, diagnostics that detect when injector drivers are in a "shorted-lo" state may correctly identify faults when the engine injectors are not enabled. Engine injectors may not be enabled, for example, during deceleration fuel cut-off (DFCO) and/or torque reduction events. The FICM 17 may not execute default actions when the FICM 17 detects fault(s) with the fuel injector outputs 156. The FICM 17 may not execute certain default actions to prevent the default actions from invalidating or competing with ECM default actions.

If the FICM 17 determines a fault(s) is present with a particular fuel system, the FICM 17 may perform a default action to transition between liquid and gaseous fuel systems. The FICM 17 does not take default actions based on an ECM diagnostic trouble code (DTC) fault status. For OBD (US OBD2, or European EOBD) applications, the FICM 17 may perform a default action based on a detected fault of the FICM 17 and a corresponding DTC is set within the ECM 16. The FICM 17 maintains a faulted fuel system in an active state until a MIL request for the fault is active, unless the default action performed does not interfere with MIL illumination.

To maintain OBD compliance, the ECM 16 and/or the FICM 17 do not prevent MIL activation when the default actions are performed. The ECM (master) 16 may manage the OBD monitoring except for the gaseous sensors and actuators. The ECM 16 may be a master OBD device and the FICM 17 may be a primary or a secondary OBD device. The FICM 17 may provide an OBD report to the ECM 16.

The ECM 16 may provide one or more of the engine parameter signals to support FICM 17 fuel injection control and fuel system diagnostics. These diagnostics include control module integrity tests (i.e. RAM/ROM/processor tests) as well as comprehensive component checks (i.e. fuel shut-off solenoid control circuit checks), and system functional checks (i.e. vaporizer heater performance checks).

The second fuel injector compensation module 204 includes rail temperature, rail pressure, and injector voltage modules 240, 242, 244. The second fuel injector compensation module 204 generates the fuel injector command signals 182'-185' based on signals from the modules 241-244. Rail temperatures and rail pressures of gaseous fuel rails and fuel injector voltages are provided in a rail temperature signal, a rail pressure signal and a fuel injector voltage signal. The second fuel injection compensation module 204 further includes an injector control servo (ICS) module 246 and a mass determination module 248 that receives injector timing and flow rate signals 245, 247 generated by the ICS module 246. The injector timing and flow rates are generated based on pulse width signals (e.g., the fuel injector command signals 182-185). The mass determination module 248 determines the mass of gaseous fuel to be injected by each of the fuel injectors 155 and may generate respective updated opening time and fuel rate signals. The updated time and fuel rate signals may be provided to the fuel injectors 155.

Sensor Signals

The ECM 16 may receive various engine sensor signals 249, such as a crank position signal (CKP), a throttle position signal (TP), engine coolant temperature signal (ECT), etc. Sensor information in and/or derived from the sensor signals may be provided to the FICM 17 via the CAN 19. The signals generated by the FICM 17 (e.g., the injector signals 152, 154 and CAN signals) may be based on the sensor information including the signals transmitted by the ECM 16 and the fuel injectors 156.

The FICM 17 receives various sensor signals from gaseous (or alternative) fuel delivery sensors, such as a rail temperature signal, a pressure sensor signal, an injector voltage signal, and gaseous fuel delivery sensor signals (collectively 251). The gaseous fuel delivery sensor signals 251 may indicate states of gaseous fuel actuators such as valves, solenoids, a vaporizer, a heater, a regulator, etc. The sensor information may be used to generate the second fault signal FAULT2 229, other signals transmitted to the ECM 16, and/or fuel injector command signals generated by the FICM 17.

The FICM 17 sends fault information to the ECM 16 to store a fault and set a MIL. Depending on the fault, the FICM 17 may switch from a gaseous fuel mode (i.e. gaseous fuel supplied to the engine) to a liquid fuel mode (gasoline provided to the engine). The ECM 16 and the FICM 17 may default to operating in the liquid fuel mode when communication between the ECM 16 and the FICM 17 is interrupted.

Fuel System Adaptation

The FICM (slave) 17 may not perform gaseous composition adaptation. The ECM 16 may adjust control based on fuel source composition variation. The ECM 16 may use stored fuel composition parameters and/or the FICM 17 may calculate and transmit fuel composition information to the ECM 16.

Referring now also to FIG. 4, the ECM 16 and the FICM 17 are shown. The ECM 16 includes a first fuel source adaptation module 250 and a second fuel source adaptation module 252 that access respective memories 254, 256 of the calibration module 176. The first fuel source adaptation module 250 is used for a first (liquid) fuel source and the second fuel source adaptation module 252 is used for the second (gaseous) fuel source. Two adaptations are performed by the ECM 16, one for each of the fuel sources. The memories 254, 256 may be located external to the calibration module 176. Each of the memories 254, 256 may include respective LTMs (Long Term Memories) based on both pre and post O2 sensor feedback for each fuel source. LTMs may store information for as little as a few days or as long as decades. Long term adaptations are performed for each fuel source.

The first and second fuel source adaptation modules 250, 252 generate gain signals GAIN1 253, GAIN2 255. The gain signals GAIN1, GAIN2 may be generated based on a gain select signal GAINSEL 257 from an adaptation gain selection module 258. The gain select signal GAINSEL 257 is generated based on the fuel source. The first fuel injection module 162 may generate the fuel injector command signals 182-185 based on the gain signals GAIN1 253 or GAIN2 255, dependant on the fuel source.

Two different adaptive maps (one for liquid fuel and one for gaseous fuel) may be stored in the memories 254, 256 and accessed by the ECM 16 for adaptation of fuel quality during liquid fuel mode and gaseous fuel mode, respectively. Each map accounts for drift of components associated with fuel in use.

Fuel system specific fuel trim adjustments are used in bi-fuel applications. This is a consequence of fuel injector and related fuel system variations. The ECM 16 is capable of providing fuel control adaptation for two fuel systems. For bi-fuel vehicles, dedicated adaptive memory cells are used when operating on each of the fuel sources. The available adaptation parameters include both long term primary fuel corrections (i.e. LTMs), as well as long term secondary fuel corrections (i.e. post $O_2$ offsets). The ECM 16 uses the fuel mode selection signal MODE 188 and related transition logic to decide which set of closed loop adaptation gains may be applied. Evaporative canister purge control remains enabled regardless of the active fuel source in bi-fuel applications.

The ECM 16 maintains long term primary and secondary fuel trim adaptive memory for each fuel system. The ECM 16 determines which set of fuel trim adaptive memory cells and associated failure limits are active based on the state of the fuel mode status signal. The ECM 16 also receives from the FICM 17 lean and rich fuel trim failure limit offsets, which are applied to the failure limits stored in the ECM's calibration memory. The limit offsets are communicated via the alternative fuel lean fuel trim limit offset and alternative fuel rich fuel trim limit offset signals. The purpose of these signals is to prevent the need for ECM calibration changes to accommodate gaseous fuel system (diagnostic) development.

The ECM 16 further includes a FPED module 260 and a FPEDOCS module 262 that provide respective signals 261, 263 to the FICM 17. The ECM 16 yet further includes a base fuel bias module 264 that generates a bias signal BIAS 265 based on AFERBO and AFPOBO signals 267, 269 received from the FICM 17. The first fuel injection module 162 may generate the fuel injector command signals 182-185 based on the bias signal BIAS 265 and the gain signals $GAIN_1$ 253, $GAIN_2$ 255.

Torque Estimation Based on Faults

The ECM 16 includes the first diagnostic module 218, which receives AFLFTLO and AFRFTLO signals 271, 273 from the FICM 17. The first diagnostic module 218 includes a fault monitoring module 266 that receives a fuel injector control module injection fault active (FICMIFA) signal 275 from the second diagnostic module 228 of the FICM 17. The first diagnostic module 218 generates the first fault signal FAULT1 219 based on the AFLFTLO and AFRFTLO signals 271, 273 and the FICMIFA signal 275. The first fault signal FAULT1 219 may be provided to a torque estimation module 270 of the ECM 16. Torque estimation performed by the torque estimation module 270 may be based on the first fault signal FAULT1 219.

The torque estimation module 270 may update estimated torque outputs based on the fuel mode signal MODE 188'. Other modules may be included to generate torque requests. For example, a module may be provided to arbitrate requests and another module may be provided to manage torque output as a function of the arbitrated torque request(s). There are 2 primary means to control torque: spark for fast response and throttle (airflow) for slower requests with a wider range of authority. Control of fuel is typically an indirect consequence of controlling the airflow (i.e. need to match fuel to air).

The ECM 16 monitors fuel injector outputs for faults and provides this information to torque estimation functions of the torque estimation module 270. The ECM 16 receives a fuel injector control module fuel delivery fault active (FICMFDFA) signal 277 from the FICM 17. This signal indicates when the FICM 17 has detected a fault in one of its input and/or output injector circuits or other sensor/actuator that could result in degraded ECM torque estimation accuracy. This allows the ECM 16 to handle FICM injector circuit faults. The FICM 17 also provides diagnostic status signals and status for other FICM faults. The FICM 17 transmits the FICMFDFA signal 277 with a TRUE value when a fault is active on any injector (input or output) circuit. The FICMFDFA signal 277 may also be set to TRUE if there are other active FICM faults.

Torque Control

At cold ambient conditions, LPG fuel flow capacity is limited by the regulator/vaporizer/heater(s) of the gaseous fuel delivery system's ability to provide sufficient fuel in vapor form. Engine fuel flow demand may exceed the fuel system capability under high speed/load conditions. The ECM 16 limits engine torque via controlling maximum APC (air mass per cylinder) to prevent ECM fault indications during these conditions (i.e. misfire, fuel trim, $O_2$ monitors). The engine torque limit is adjustable as a function of engine coolant temperature. The engine torque may be limited based on when alternative fuel preheating is active. Bi-fuel applications may not use this feature, as the liquid fuel system remains active until the gaseous fuel system has been sufficiently heated.

With gaseous fuel injection, lower effective VE (volumetric efficiency) is expected due to fresh air charge displacement and reduced charge cooling. For a mono-fuel application, an ECM torque model may be calibrated to reflect operation on the gaseous fuel.

The ECM 16 calculates fuel command (mass of fuel to be injected) for both liquid and gaseous fuels. For example, CNG has a higher heating value (e.g. CNG 47 kJ/g vs. gasoline 43.5 kJ/g) and higher stoichiometric AFR (CNG 16.4 vs. gasoline 14.6), therefore due to air displacement by fuel, reduced charge cooling, and chemical properties produces less peak power and power per unit of air.

Fuel Trim Diagnostics

The FICM 17 may not perform fuel trim diagnostics, as this may be performed by the ECM 16. The ECM 16 may: A) perform a fuel adaptive learn for gaseous fuel sources (e.g., LPG or CNG) to generate dedicated fuel trim values and perform fuel trim diagnostics; B) have a lambda bias (fuel bias offset) or dedicated lambda target for gaseous fuel sources; C) perform open loop fuel control; D) perform open loop lambda target and have dedicated open loop maps in the master ECM 16; E) switch between liquid and gaseous fuel modes based on a fuel mode command from the FICM; F)

have spark advance maps, which may be used for liquid and/or gaseous fuel sources; G) perform torque management for liquid and gaseous fuel sources; H) store dedicated diagnostic thresholds for gaseous fuel usage; and I) have dedicated catalyser functions.

Fuel Bias Offset

The FICM 17 provides a fuel bias offset via the CAN 19 to the ECM 16. The fuel bias offset (lambda) refers to an inverse of an equivalence ratio or actual air-to-fuel ratio divided by a stoichiometric ratio. The equivalence ratio may be equal to a fuel-to-oxidizer ratio divided by a stoichiometric fuel-to-oxidizer ratio.

FICM

The FICM 17 includes AFERBO and AFPOBO modules 280, 282 that generate the AFERBO and AFPOBO signals 267, 269. The AFERO and AFPOBO signals 267, 269 may be generated from information stored in memory 283 of the FICM 17 and CAN signals from the ECM containing engine operating conditions (e.g. engine speed, manifold absolute pressure). The AFERBO and AFPOBO signals 267, 269 may be used by the FICM 17 to shift equivalence ratio calculations performed by the ECM 16. This allows the FICM 17 to adjust ECM operation to provide, for example, stoichiometric performance. The second diagnostic module 228 of the FICM 17 includes a fault detection module 284 that generates the FICMFDFA signal. The FICM 17 also includes an offset module 286 that generates the AFLFTLO and AFRFTLO signals 271, 273.

The FICM 17 may further include a solenoid and relay control module 290, a fuel-cut off module 292, a vehicle operating state module 294, a fuel pump enable module 296, a fuel tank fill level module 298, a fuel vaporizer heater control (FVHC) and starter motor inhibit request (SMIR) module 300 and a LPG fuel pump module 302. Many of the above modules are further described below.

High and Low Pressure Fuel Shut-Off Solenoids

The solenoid and relay control module 290 has control over high-pressure (high pressure or at fuel tank) and low-pressure (low pressure or at fuel rail) fuel shut-off solenoids either directly or via relays. These solenoids may be energized when permitted by the fuel pump enable discrete output hard-wire of the ECM 16. The fuel shut-off solenoids may be deenergized temporarily during engine operation as part of individual solenoid performance control and system fault monitoring. Fuel shut off solenoids are deactivated as a consequence of a fuel mode switch to the primary fuel that results from a local area network (LAN) failure. Fuel pump enabled discrete output commanded status signal may be used in the diagnosis of the ECM hard-wire signal, and may be used for control purposes. The FICM 17 may receive the ECM hard-wire signal as an enabler for the fuel shut-off solenoids.

Fuel Shut-Off Switch

The fuel-cut off module 292 may deactivate the fuel shut-off solenoids via input from a driver operated switch (e.g., driver input module 20 of FIG. 1) in lieu of system leak diagnostics. This allows the driver to test the fuel shut-off solenoid integrity as well as provide a device for evacuating the fuel supply lines during vehicle servicing. The FICM 17 deactivates the fuel shut-off solenoids when this switch is activated. All other fuel related functions (ECM and FICM) may be active. In cases where the driver depresses the switch and the engine continues to run, the driver is made aware that the fuel shut-off solenoids are not closing properly. Although ECM diagnostic fault(s) may trigger in these instances, the ECM 16 diagnostics remain active regardless of the state of the fuel shut-off switch.

Fuel Mode Switch

The fuel mode switch active signal may indicate that the BCM is requesting gaseous fuel usage. The FICM 17 may determine whether gaseous fuel usage is appropriate based on the fuel mode switch signal, sensor signals received by the FICM 17, and/or sensor information received by the ECM 16 and transmitted to the FICM 17. The FICM 17 may perform this determination based on engine characteristics and/or the engine parameter signals received from the ECM 16. The determination may also be made based on the fuel injector command signals of the ECM 16.

Vehicle Operating State

The vehicle operating state module 294 receives one or more of the engine parameter signals from the ECM 16 and the PLT to determine vehicle operating state(s). These signals are used for injector, vaporizer, and fuel pump control/adjustments made by the FICM 17.

Fuel Pump Enable Discrete Output and Command Status

The fuel pump enable module 296 receives the fuel pump enable discrete (FPED) signal from the ECM 16. The FPED signal indicates whether the fuel pump is enabled and whether fuel delivery to the engine is permitted. The fuel pump enable module 296 may activate fuel pump(s) and fuel shut off solenoids when the FPED signal is active (high). The fuel pump enable module 296 disables fuel pump(s) and shut off solenoids when the FPED signal is inactive (low). In the event of airbag deployment or similar safety action, the FPED signal as determined by the ECM 16 may be used to indicate that the fuel supply should be disabled.

The fuel pump enable module 296 also receives the fuel pump enabled discrete output commanded status (FPEDOCS) signal 263 to diagnose the fuel pump enable discrete output. The FPEDOCS signal 263 mirrors the expected state of the fuel pump enable discrete. The FPEDOCS signal 263 is primarily used in the diagnosis of the FPED signal. In some applications it may not be possible for the FICM 17 to use the FPED signal. In these instances, the FPEDOCS signal 263 may be used for fuel supply control.

Fuel Tank Fill Level

The fuel tank fill level module 298 calculates a gaseous fuel (or secondary) tank fill level for bi-fuel applications, and some mono-fuel applications. For bi-fuel applications, the ECM 16 may not receive or use fuel level information from the FICM 17 for control or diagnostic purposes. The ECM 16 may directly monitor (gaseous) mono-fuel fuel level sensors, as gaseous fuel level monitoring may use float sensors similar to those used for liquid fuels (e.g. LPG is stored as a liquid). In gaseous fuel applications, the FICM 17 may provide fuel level (display) information to the ECM 16 and/or body and display control modules. The FICM 17 may gate the gaseous fuel level information to the platform control modules based on fuel level percent and fuel level percent validity signals provided by the ECM 16. The FICM 17 may gate the fuel level information when providing fuel level information in applications where the ECM 16 is monitoring the fuel level (hard wire) inputs directly.

The ECM 16 may directly monitor a primary fuel level sensor (i.e. 'float' fluid level sensor for liquid and mono-fuel LPG fuel systems). For bi-fuel capable vehicles, the ECM 16 monitors the primary (liquid) fuel level sensor(s). The liquid fuel system is considered the primary system for bi-fuel applications. The ECM 16 may not receive or use fuel level information from the FICM 17 for control or diagnostic purposes. The ECM 16 does not allow low fuel indications to be used for the purpose of diagnostic disablement when the gaseous fuel system is active. This allows fuel system related diagnostics to remain active and compliant when a low gasoline fuel level would otherwise inhibit fuel system related diagnostics.

For bi-fuel applications, the ECM 16 receives the fuel mode selection signal MODE from the FICM 17. The ECM 16 inhibits the 'low fuel level' determination associated with the primary fuel which is used for fuel system related diagnostic disablement (i.e. the emissions related fuel level low signal) when the gaseous fuel system is active (i.e. as indicated by the fuel mode status signal). This is performed such that the fuel system related diagnostics remain active (i.e. compliant) when the gaseous fuel system is active regardless of the current primary (liquid) fuel level. In some applications (gaseous mono-fuel applications), the ECM 16 transmits gaseous fuel level to the FICM 17 such that the FICM 17 can provide fuel level display information to body and display control modules. Low fuel level disablement of diagnostics may be performed in gaseous mono-fuel applications.

Fuel Vaporizer Heater Control and Starter Motor Inhibit Request

Fuel in the rails and injectors of gaseous fuel systems should be in a gaseous state, in order to accurately deliver fuel to the engine. The boiling points for primary LPG fuel components are quite different (i.e. −42 C for propane, and −0.5 C for butane). A significant amount of energy (i.e. latent heat of vaporization) is required to boil the liquid fuel supplied to the regulator (i.e. 423 J/g for propane, and 386 J/g for butane). To ensure the fuel in the rail is in gaseous form, the fuel heater is used to assist the vaporizer (shown in FIG. 5, using, for example, items 330, 332, 342) in vaporizing liquid fuel into a gaseous state. The vaporizer typically makes use of internal engine coolant passages to transmit heat to the fuel when the engine is at or near normal operating temperatures.

During cold conditions, a supplemental heat source may be used to provide sufficient vaporized fuel to start and run the engine until the engine coolant is sufficiently warm to achieve liquid fuel vaporization via the engine coolant without supplemental heating. The supplemental heating may be accomplished with electrically resistive element(s), referred to as PTC (positive temperature coefficient) heaters. On a key-up, the FVHC and SMIR module 300 evaluates if heat from the PTC heater of the vaporizer is needed. The FICM 17 transmits the alternative fuel pre-heating active (AFPA) signal to the ECM 16 when the PTC heater is engaged and a starter motor inhibit is to be performed. In some applications, it may not be possible/desirable to implement starter motor inhibit when the heater is engaged. Then, the AFPA signal may be used to activate a driver warning, such as a wait to start/drive warning. The FVHC and SMIR module 300 receives one or more of the engine parameter signals from the ECM 16 to determine when to enable PTC heater(s).

The ECM 16 monitors the AFPA signal provided by the FICM 17. The AFPA signal indicates that the fuel vaporizer heater(s) are active, but the fuel rail temperature is too low to permit starting of the engine. The ECM 16 disables the starter motor when this signal is received with a value of TRUE. In cases where the ECM 16 sets a FICM lost communication DTC, the ECM 16 does not inhibit the starter motor. This action prevents lost communication faults from resulting in 'no crank' conditions.

LPG Fuel Pump Enable

During cold ambient conditions, the fuel tank temperature may be lower than required to provide sufficient vaporized fuel rail pressure (i.e. butane boils at ~0 C, and there is a pressure drop across the fuel regulator/vaporizer). The LPG fuel enable module 302 energizes the gaseous fuel pump to provide sufficient fuel pressure and flow to a fuel regulator and/or vaporizer inlet. The FICM 17 may also energize the gaseous fuel pump during periods of high engine fuel demand. The LPG fuel enable module 302 may energize (activate) the LPG fuel pump based on one or more of the engine parameter signals received from the ECM 16, and sensor signals received by the FICM [17].

Distributed Fuel Delivery System

The distributed fuel delivery system allows for integration of gaseous fuel control modules, enabling more accurate and robust gaseous fuel control and diagnostics. The integration provides fuel adaptation within the ECM 16 for each fuel, which allows the ECM 16 to diagnose both liquid and gaseous fuel delivery systems without the need to duplicate this function within the FICM 17. The integration also provides a fuel bias (equivalence ratio) offset feature via CAN interface within the ECM 16, which replaces the need for the FICM 17 to physically interrupt an $O_2$ sensor signal to achieve this function. The integration further allows the ECM 16 to diagnose $O_2$ sensors without duplicating this diagnostic function in the FICM 17.

The distributed fuel delivery system provides a fuel bias (equivalence ratio) offset feature performed by the ECM 16 based on bias offset information received from the FICM 17 via the CAN interface. This replaces the need for the FICM 17 to physically interrupt the $O_2$ sensor signal to achieve this function and allows the ECM 16 to fully diagnose $O_2$ sensors without duplicating this diagnostic function within the FICM 17. This also enhances engine control system robustness by reducing the number of electrical hardwire interfaces.

The distributed fuel delivery system minimizes the FICM 17 need to estimate the intended combustion fuel mass by removing lost fuel and transient fuel contributions that are normally present in ECM fuel injector outputs during gaseous fuel operation. The FICM 17 may estimate the combustion fuel mass without removing lost fuel and transient fuel contributions, as this is performed by the ECM 16. The combustion fuel mass is the appropriate value for the fuel that is being used.

The distributed fuel delivery system yet further allows the FICM 17 to adjust ECM fuel control functions by augmenting ECM calibrations through CAN interfaces without needing access to ECM calibration information. Calibration information in the ECM 16 is updated by the ECM 16 based on information (e.g., $O_2$ bias offset values) received from the FICM 17 when operating on the gaseous fuel. ECM control functions use information contained in the ECM calibration module 176, augmented by CAN information received from the FICM 17.

CAN Interface

The CAN interface enables: i) coordination of fuel mode transitions between the ECM 16 and the FICM 17; ii) closed loop fuel biasing (pre and post catalyst $O_2$ sensor bias offsets) during gaseous fuel operation within the ECM 16 based on bias requests from the FICM 17; iii) characterization of gaseous fuel injectors to control exchange of injector pulse width information between the ECM 16 and the FICM 17; and iv) the FICM 17 to augment ECM calibrations. Additionally, the CAN interface 19 allows the FICM 17 to transmit fuel system diagnostic threshold modifiers used when operating on gaseous fuel, and the exchange of engine/fuel system operating information between the FICM 17 and the ECM 16.

In the above described distributed fuel delivery system of FIGS. 1-4, the ECM 16 and the FICM 17 interface with the CAN 19 (CAN interface) to exchange information with each other. The CAN interface is used to distribute and integrate engine control system functions between the ECM 16 and the FICM 17. The CAN interface 19, via the Fuel Mode signal, allows coordination between the ECM 16 and the FICM 17 of: fuel correction multipliers (LTM); removal of liquid fuel dynamics corrections such as lost and transient fuel dynamics; closed loop fuel biasing; and characterization of gaseous fuel injectors. There are modifications in the ECM 16 to enable these features. The CAN interface 19 allows the FICM 17 to transmit fuel mode information, which is then used by the ECM 16. The CAN interface 19 allows: the coordination of fuel modes and transitions; the FICM 17 to modify ECM calibrations concerning characterization of gaseous fuel injectors, setting, generating and using of fuel system diagnostic thresholds; the FICM 17 to request changes to the gasoline equivalence ratio biasing; the FICM 17 to receive engine operating information from the ECM 16; and the exchange of other information for fuel control and diagnosis (e.g. fuel level, FICM diagnostic status, preheating active). The FICM 17 uses the engine operating information for gaseous fuel control and diagnosis.

In FIG. 5, a bi-fuel delivery system 310 is shown. The bi-fuel delivery system 310 includes the ECM 16 and the FICM 17 and first and second fuel injection supply circuits (fuel injection delivery systems) 312, 314. The first fuel injection circuit 312 includes a first fuel tank 316, a fuel pump 318, a fuel line 320, solenoids and/or relays 322, a first fuel rail 324 and a first set of fuel injectors 326. The first fuel injection circuit 312 may also include sensors within the first fuel rail (e.g. temperature, pressure). The first fuel tank 316 may store a first fuel source (e.g., liquid fuel). The fuel pump 318, solenoids and/or relays 322 may be referred to collectively as first fuel source actuators.

The second fuel injection circuit 314 includes a second fuel tank 330, a fuel valve 332, a second fuel line 334, other valves 336, a second fuel rail 338 and a second set of fuel injectors 340. The second fuel injection circuit 314 may also include a regulator, a vaporizer, and/or heater 342 and/or a third fuel line 344 between the second fuel line 334 and the other valves 336. The fuel valve 332, the other valves 336, the regulator, vaporizer, and/or heater 342 may collectively be referred to as second fuel source actuators. The second fuel injection circuit 314 may also include sensors within the second fuel rail (e.g. temperature, pressure). The second fuel tank 330 may store a second fuel source (e.g., gaseous fuel). The second set of fuel injectors 340 is associated with the same cylinders of an engine as the first set of fuel injectors 326 (i.e. one liquid fuel injector and one gaseous fuel injector per cylinder).

The ECM 16 may control operation of the first fuel source actuators. The FICM 17 may control operation of the first and second set of fuel injectors 326, 340 and the second fuel source actuators. The FICM 17 controls operation of the first and second set of fuel injectors 326, 340 based on fuel injector command signals (e.g., 182-185) received from the ECM 16.

In a distributed fuel delivery system, the FICM 17 may have direct control of fuel injectors for both mono-fuel and bi-fuel applications. The FICM 17 has hard wire inputs for the fuel injector outputs of the ECM 16 and uses them to generate compensated gaseous (second fuel source) fuel injector driver output commands. For gaseous fuel injector control, the injector waveform of the ECM 16 is adjusted to compensate for gaseous fuel rail pressure, gaseous fuel rail temperature, manifold absolute pressure, and differences in gaseous fuel injector operating characteristics. This creates an output waveform that delivers the appropriate amount of gaseous fuel. The ECM 16 may continue to monitor $O_2$ sensors to correct fueling errors using closed loop fuel trim functions.

Bi-fuel system control functions are distributed between the ECM 16 and the FICM 17 to maintain adequate emissions, diagnostic, safety, and drive quality. Liquid and gaseous mono-fuel and bi-fuel applications are supported. For the bi-fuel applications, the liquid fuel delivery system may be active following each cold start to facilitate emissions control, as well as to ensure that there is sufficient heat available to vaporize the gaseous fuel, or prevent gaseous fuel pressure regulator "freeze up". Heat is provided to vaporize LPG, and in the case of CNG, prevent the regulator from freezing. With CNG, there is a temperature drop associated with reducing (regulating) pressure from the tank that can under certain conditions (e.g., when there is moisture in the tank), result in the formation of hydrates (ice—hydrocarbon crystals) that impair the performance of the regulator.

Figure 6:
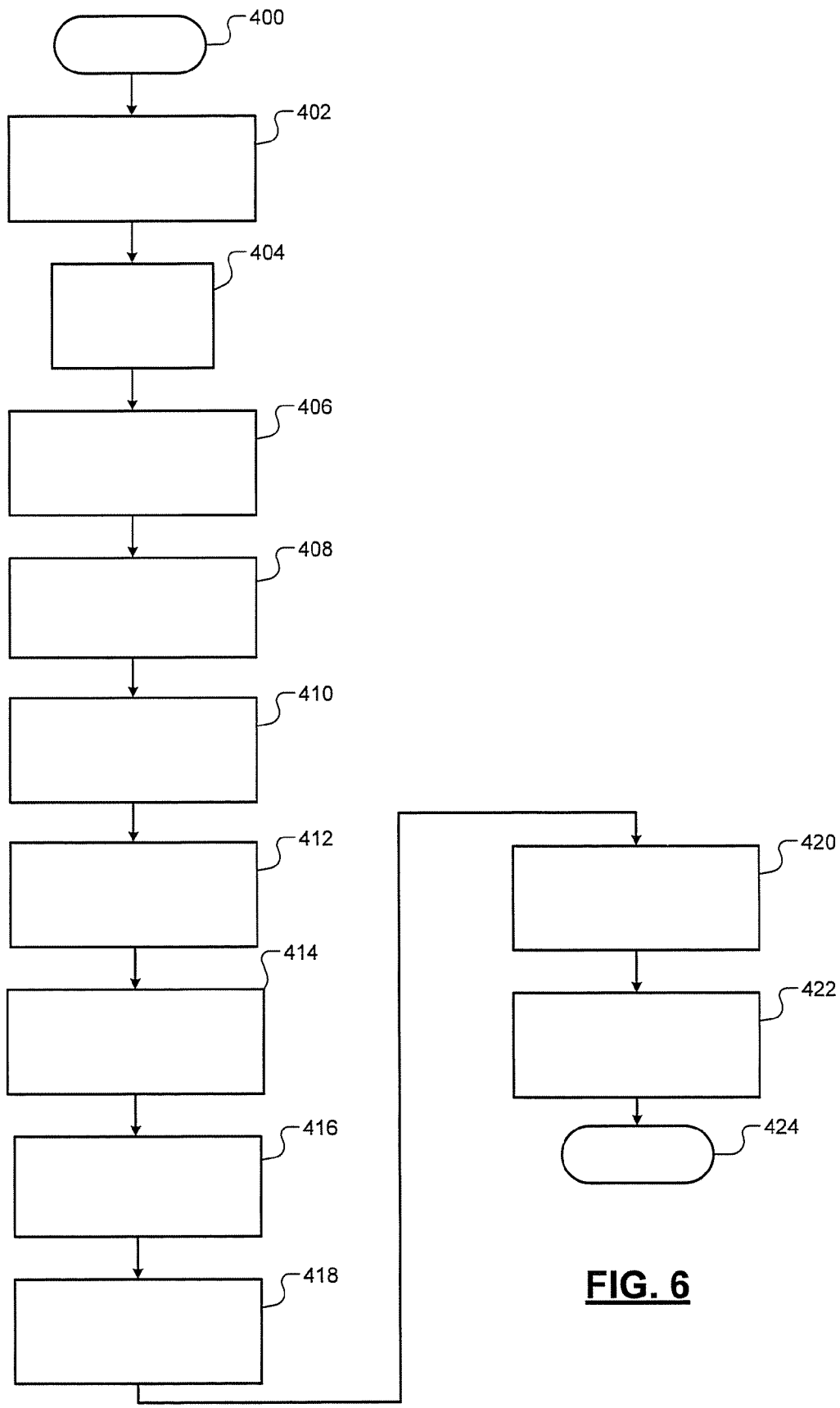
FIG. 6 illustrates a method of operating a distributed fuel injection and diagnostic system in accordance with the present disclosure.

In FIG. 6, a method of operating a distributed fuel injection and diagnostic system is shown. Although the method is primarily described with respect to the embodiments of FIGS. 1-5, the method may be modified for other embodiments of the present disclosure. The following tasks may be iteratively performed. The method may begin at 400.

At 402, the ECM 16 may transmit one or more engine operating parameter signals to the FICM 17. At 404, the FICM 17 generates the fuel mode selection (status) signal MODE. Fuel mode transitions (e.g., between liquid and gaseous fuel modes) are coordinated between the ECM 16 and the FICM 17, allowing the fuel mode transitions to be completed in the span (period) of one engine cycle. This is performed to correctly apply fuel injector control, closed loop fuel biasing, and closed loop adaptation parameters when operating with different fuel sources. This is also performed to minimize fuel delivery errors, both during and following a fuel mode transition. Once the fuel mode status signal MODE from the FICM 17 changes state, the ECM 16 alters fuel pulse calculations starting with the next injection event for a pre-determined cylinder and continues for subsequent cylinders.

The ECM 16 accomplishes this by detecting a fuel mode change at a specific cylinder event that affects fuel pulse calculations for a first change-over cylinder and that does not affect fuel pulses in progress for other cylinders. The ECM 16 alters fuel calculations for the updated (new) fuel mode to affect the next injection for the pre-determined lead cylinder event when the fuel mode status changes state. At this point, subsequent fuel injection calculations for cylinders of the engine 12 are for the new (subsequent) fuel mode.

At 406, the ECM 16 may remove lost and transient fuel contributions from fuel injector command signals of the ECM 16 based on the selected fuel mode. For certain conditions, cold fuel enrichment and transient fueling adjustments are not required or performed for gaseous fuels. For bi-fuel applications, when the gaseous fuel system is active, the ECM 16 may remove lost fuel and transient fuel contributions that would normally be present in the fuel injector outputs of the ECM 16 when operating on liquid fuels.

For mono-fuel applications, the lost and transient fuel calibrations reflect the needs (if any) of the gaseous fuel source (i.e. typically calibrated OFF). In bi-fuel applications, the FICM 17 is not required to remove the open loop and transient fuel (liquid fuel) corrections to maintain proper fuel control when operating on the gaseous fuel source. The ECM 16 removes the open loop and transient fuel (gasoline) corrections while in gaseous fuel mode. This also improves ECM fuel consumption and torque estimations.

The ECM 16 may not remove open loop and transient fuel (liquid fuel) corrections when fuel is delivered to the engine during cranking of the engine, while operating in the gaseous fuel source mode. With the gaseous fuel source active, the FICM 17 adjusts crank fueling commands to the gaseous fuel injectors by compensating for liquid fuel open loop and transient corrections in the fuel injector command signals 182-185.

The ECM 16 may provide the FICM 17 with an indication of the liquid fuel delivery system ethanol content via fuel alcohol composition and fuel alcohol composition validity signals. For bi-fuel capable vehicles, when the liquid fuel delivery system is active, base fueling commands are generated for base fuel operation (i.e. E0 or lowest calibrated fuel ethanol content)—with the appropriate lost fuel and transient fuel contributions removed as previously described. This is performed to prevent fueling commands when the gaseous fuel source is active from being influenced by changes in the fuel composition of the primary fuel system (e.g., the gasoline fuel delivery system).

At 408, the FICM 17 obtains $O_2$ bias information from a stored bias table and from the engine operating parameters from the ECM 16, and generates an $O_2$ bias request that is transmitted to the ECM 16. The ECM 16 receives AFERBO and AFPOBO signals 267, 269 from the FICM 17. The $O_2$ bias signal is generated based on a determined fuel mass and other engine operating parameters, as received at 402. The FICM 17 determines a gaseous fuel mass based on the fuel injector command signals from the ECM 16, that include pulse width information. Gaseous fuel injector opening times are determined based on gaseous fuel mass information from the ECM injector command signals, and the gaseous fuel injector slope and offset information that is looked up in FICM memory 283, as a function of gaseous fuel pressure and temperature, operating voltage, and other engine operating parameters. The FICM 17 may further adjust gaseous fuel mass, and hence, gaseous fuel injector opening times based on the engine parameter signals received from the ECM at 402.

At 410, the ECM 16 and the FICM 17 provide closed loop fuel biasing when operating on the gaseous fuel. The FICM 17 provides its desired equivalence ratio offset (for front $O_2$ sensor bias adjustment) and post $O_2$ sensor bias offset CAN signals to the ECM 16. The ECM 16 applies these offsets when indicated by the fuel mode signal MODE. These signals provide offsets to ECM control parameters to take advantage of the full-range emissions control functions provided by the ECM 16.

At 412, the ECM 16 may perform one of two closed loop fuel control adaptations based on the fuel mode. The ECM 16 provides fuel control adaptation for two fuel delivery systems. Separate adaptive memory cells are recognized when operating on the gaseous fuel source as opposed to when operating on the liquid fuel source. The available adaptation parameters include both long term primary fuel corrections (i.e. LTMs) as well as long term secondary fuel corrections (i.e. post $O_2$ offsets) as a function of the fuel mode status provided by the FICM 17. This feature enables the ECM 16 to continue the diagnostic monitoring of the fuel system without duplicating this diagnostic function within the FICM 17.

At 414, the ECM 16 obtains fuel flow rate (injector slope) and offset values from memory of the ECM 16 based on the fuel mode signal MODE. At 416, the ECM 16 receives the AFIFO, AFIOO and AFIMPO signals 225, 227, 221 from the FICM 17.

At 418, the ECM 16 generates the fuel injector command signals for nominal pressure and temperatures based on the fuel flow rate and offset values in the ECM memory, and the AFIFO, AFIOO and AFIMPO signals 225, 227, 221 received from the FICM 17.

The ECM 16 may calculate fuel injector opening times based on various inputs and calculations (i.e. engine parameter inputs, a MAF, an open loop NF ratio, closed loop fuel trim values, transient fuel adjustment values, etc. . . . ). The ECM 16 outputs the calculated injector waveform (pulse width command) on fuel injector output pins.

The ECM 16 selects the gaseous injector fuel flow rate, offset and minimum pulse width to be used to calculate the appropriate injector pulse width for a nominal fuel pressure and temperature. This may be performed when operating on the gaseous fuel delivery system (i.e. as determined and communicated by the fuel mode signal MODE via a CAN message from the FICM 17). The same nominal gaseous fuel pressure and temperature refer to a fuel pressure and temperature used by both the ECM 16 and the FICM 17. The setting of the injector pulse width by the ECM 16 for a nominal constant fuel pressure and temperature allows the FICM 17 to better determine the fuel mass desired by the ECM 16.

An ECM fuel pulse when operating on gasoline may be compensated for actual variations in gasoline fuel temperature and pressure. However, since the ECM 16 is now calculating the gaseous fuel injector pulse width (PW) with a constant nominal fuel pressure/temperature, the FICM 17 does not need to estimate what were the actual gasoline fuel pressures and temperatures. Both ECM and FICM must comprehend the same nominal operating conditions (a coordinated calibration) in their respective calculations. The FICM 17 fuel pulse is calculated by adjusting the ECM's fuel pulse, based on nominal operating conditions, for the actual gaseous fuel temperature and pressure.

Defining gaseous fuel injector calibrations within the ECM 16 is performed to coordinate the injector pulse width duration between the ECM 16 and the FICM 17. This coordination allows the FICM injector pulse width to be consistent relative to the injector pulse width of the ECM 16 (i.e. longer with the same start of injection (SOI) timing or shorter with a predetermined SOI delay), thus enabling the calculation of the gaseous fuel mass within the same engine cycle.

When operating on the gaseous (e.g., LPG/CNG bi-fuel or mono-fuel) fuel system, the ECM injector outputs (i.e. engine injector output (A-D)) represents the appropriate gaseous fuel injection command at a nominal fuel pressure and temperature (i.e. injector flow rate normalized to a nominal pressure and temperature). The ECM injector outputs include the opening time adjustment used for the gaseous fuel injectors at nominal conditions. The ECM 16 achieves this with internal calibration values for the gaseous fuel injector flow rate and offsets that represent the best known values at the time ECM calibrations are released. Additionally, the ECM 16 receives alternative fuel injector flow offset and alternative fuel injector opening offset signals from the FICM 17.

This allows the ECM injector output pulse width to be less than the gaseous fuel injection output pulse width calculated by the FICM 17. As a result, a nominally operating system does not cause ECM fuel trim adjustments to indicate a rich error. When the gaseous fuel delivery system is active, an ECM assertion of a constant injector flow rate and opening time is provided since the ECM 16 does not have access to data used to calculate the actual gaseous fuel injector flow rate and FICM injector driver corrections (i.e. rail temperature, rail pressure, and injector voltages of the gaseous fuel delivery system).

The ECM 16 defines a calibration that represents the minimum gaseous fuel base pulse width (i.e. the minimum controllable injector base pulse width assuming the gaseous fuel injector flow rate calibration of the ECM 16 and the AFIFO signal 225). The ECM 16 uses the (minimum pulse width) calibration to low limit the injector output commands and to inhibit closed loop fuel control learning when the gaseous fuel source is active. Similar to the method for gaseous injector flow and opening time determination, the ECM 16 receives an alternative fuel injector minimum pulse offset signal to allow the FICM 17 to modify the internal calibration of the ECM 16.

The ECM 16 contains fuel injector control characterization for a gaseous fuel delivery system, which allows the ECM 16 to synchronize fuel command pulse widths between the ECM 16 and the FICM 17. Traditional fuel injector command signals transmitted from the ECM 16 to the FICM 17 do not have enough information for the FICM 17 to accurately determine a fuel mass desired by the ECM 16 when in a gaseous fuel mode. CAN communication disclosed herein improves FICM determination of the fuel mass desired for improved control of fuel injectors.

At 420, the FICM 17 receives the fuel injector command signals and determines fuel rate strategy of the ECM 16. At 422, the FICM 17 may modify the fuel injector command signals (ECM injector outputs). When operating on the primary (i.e. liquid fuel for Bi-Fuel) fuel system, the FICM injector output waveform may be identical to that of the ECM 16 injector outputs (i.e. engine injector output (A-D)). The FICM 17 may not drive the liquid fuel injectors, but rather pass through the ECM injector outputs to the liquid fuel injectors when in the first fuel source (liquid) mode.

The FICM 17 modifies flow rates and opening times based on, for example, pressures and temperatures in the second fuel source delivery system (gaseous fuel source delivery system). The method may end at 424.

The above-described tasks 402-422 are meant to be illustrative examples; the tasks 402-422 may be performed sequentially, synchronously, simultaneously, continuously, during overlapping time periods or in a different order depending upon the application.

During the above tasks, the ECM 16 may provide lambda offset closed loop values or gaseous fuel sensor values and gaseous fuel (e.g., LPG) diagnostic trouble codes (DTCs) and other parameters (e.g., engine operating parameters) to the FICM 17.

The above-described method includes modifications of ECM calibrations by a FICM. The FICM has the option to modify ECM calibrations without needing access to calibration memory addresses of the ECM. This is done through transmission of offset signals, an equivalence ratio signal, etc. from the FICM to the ECM, via CAN.

The CAN communication disclosed herein distributes control functions between an ECM and a FICM to increase system capabilities and to improve emissions and diagnostic performance. The embodiments disclosed herein enable gaseous fuel (CNG/LPG) subsystem control modules to be integrated within a (base) engine control system while meeting requirements dictated by ever more stringent emissions and diagnostic regulations.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
  an engine control module that generates fuel injector command signals for fuel injectors of an engine and engine parameter signals that indicate operating characteristics of the engine; and
  a fuel injector control module that communicates with the engine control module via a network,
  wherein
    the engine control module transmits the engine parameter signals to the fuel injector control module via the network,
    the fuel injector control module generates compensated fuel injector signals based on the fuel injector command signals and the engine parameter signals,
    the fuel injector control module generates at least one offset signal and transmits the at least one offset signal to the engine control module via the network, and
    the engine control module receives information provided in the at least one offset signal and generates the fuel injector command signals based on the at least one offset signal.

2. The control system of claim 1, wherein:
  the at least one offset signal comprises at least one of an oxygen bias offset signal, a fuel equivalence ratio offset signal, a fuel trim limit offset signal, a fuel injector minimum pulse offset signal, a fuel flow rate offset signal, and a fuel injector opening offset signal; and
  the engine parameter signals comprise engine parameters sent from the engine control module to the fuel injector control module.

3. The control system of claim 1, wherein the engine control module comprises:
  a first fuel source adaptation module that generates a first gain signal based on a first long term fuel correction multiplier and a first oxygen offset; and
  a second fuel source adaptation module that generates a second gain signal based on a second long term fuel correction multiplier and a second oxygen offset.

4. The control system of claim 3, wherein:
  the first long term fuel correction multiplier is generated based on calibration values stored in the engine control module; and
  the second long term fuel correction multiplier is generated based on the calibration values stored in the engine control module and signals received from the fuel injector control module via the network.

5. The control system of claim 3, wherein:
  the fuel injector control module generates a fuel mode signal that indicates one of a liquid fuel mode and a gaseous fuel mode;

the fuel injector control module transmits the fuel mode signal to the engine control module via the network;

the engine control module performs a first selection that includes selecting one of the first long term fuel correction multiplier and the second long term fuel correction multiplier based on the fuel mode signal;

the engine control module performs a second selection that includes selecting one of the first oxygen offset and the second oxygen offset based on the fuel mode signal; and generates the fuel injector command signals based on the first selection and the second selection.

6. The control system of claim 5, wherein the engine control module selects equivalence ratio offsets and injector flow and opening offsets based on the fuel mode signal; and generates the fuel injector command signals based on the first selection, the second selection, the equivalence ratio offsets and the injector flow and opening offsets.

7. The control system of claim 1, wherein:

the engine control module comprises memory that stores calibration values; and the engine control module generates the fuel injector command signals based on the calibration values.

8. The control system of claim 1, wherein:

the engine control module and the fuel injector control module operate in a liquid fuel mode and a gaseous fuel mode;

the engine control module selects an injector flow rate, an offset and a minimum pulse width for a nominal fuel pressure and a nominal fuel temperature when in the gaseous fuel mode;

the engine control module generates the fuel injector command signals based on the injector flow rate, the offset and the minimum pulse width as updated based on an injector flow offset signal, an opening offset signal, and a minimum pulse width offset signal received from the fuel injector control module;

the fuel injector control module stores the nominal fuel pressure and the nominal fuel temperature;

the fuel injector control module determines a requested fuel mass for a gaseous fuel injector based on the fuel injector command signals and the nominal fuel pressure, the nominal fuel temperature and other engine parameters; and wherein the fuel injector control module generates the compensated fuel injector signals based on the requested fuel mass and a detected fuel pressure and a detected fuel temperature.

9. The control system of claim 1, wherein the engine control module generates fuel injector command signals for a gaseous fuel mode based on signals received from the fuel injector control module.

10. The control system of claim 1, wherein the engine control module:

removes lost fuel mass and transient fuel mass from a calculated fuel mass to generate a resultant fuel mass; and generates the fuel injector command signals based on the resultant fuel mass, a calibrated fuel flow, a calibrated injector amount of open time, a calibrated injector offset, a minimum pulse width, and offset signals from the fuel injector control module, wherein the fuel injector control module does not remove lost fuel contributions and transient fuel contributions from the fuel injector command signals when generating compensated fuel injector command signals.

11. The control module of claim 1, wherein:

the fuel injector control module generates an equivalence ratio offset signal and a post oxygen sensor bias offset signal;

the fuel injector control module transmits the equivalence ratio offset signal and the post oxygen sensor bias offset signal to the engine control module via the network; and the engine control module offsets engine fuel control parameters based on the equivalence ratio offset signal and the post oxygen sensor bias offset signal.

12. A control system comprising:

an engine control module that generates fuel injector command signals for fuel injectors of an engine and engine parameter signals that indicate operating characteristics of the engine; and a fuel injector control module that communicates with the engine control module via a network, wherein the engine control module transmits the engine parameter signals to the fuel injector control module via the network, the fuel injector control module generates compensated fuel injector signals based on the fuel injector command signals and the engine parameter signals, selects one of a liquid fuel mode and a gaseous fuel mode, and generates a fuel mode signal, the engine control module and the fuel injector control module switch between the liquid fuel mode and the gaseous fuel mode based on a transition of the fuel mode signal between the liquid fuel mode and the gaseous fuel mode and within a predetermined period, wherein the switch starts with a predetermined cylinder, and the engine control module adjusts fuel pulse calculations based on the fuel mode signal in the predetermined period and for a cylinder of the engine.

13. The control module of claim 12, wherein:

the fuel injector control module transmits the fuel mode signal to the engine control module via the network;

the fuel injector control module delays transitioning between the liquid fuel mode and the gaseous fuel mode for a predetermined number of engine cycles; and the engine control module delays transitioning between the liquid fuel mode and the gaseous fuel mode for the predetermined number of engine cycles.

14. An engine control module comprising:

a first adaptation module that stores a first long term multiplier for a primary fuel;

a second adaptation module that stores a second long term multiplier for a secondary fuel;

a fuel mode module receives a fuel mode signal from a fuel injector control module via a network and enables one of (i) the first adaptation module and (ii) the second adaptation module based on the fuel mode signal;

a closed loop fuel module that generates a first gain signal based on the first long term multiplier when operating on the primary fuel and a second gain signal based on the second long term multiplier when operating on the secondary fuel; and a fuel injection module that generates a fuel injector command signal based on one of the first gain signal and the second gain signal.

15. The engine control module of claim 14, further comprising:

a first calibration module that stores primary calibration data for the primary fuel; and a second calibration module that stores secondary calibration data for the secondary fuel, wherein the fuel injection module generates the fuel injector command signal based on the primary calibration data when operating on the primary fuel and based on the secondary calibration data when operating the secondary fuel.

16. The engine control module of claim 15, wherein:

the fuel mode module receives a secondary air/fuel ratio offset adjustment signal, a secondary oxygen sensor offset adjustment signal, a secondary fuel injector parameter adjustment signal, and a diagnostic limit adjustment signal from the fuel injector control module via the network; and the fuel injection module generates the fuel injector command signal based on the secondary air/fuel ratio offset adjustment signal, the secondary oxygen sensor offset adjustment signal, the secondary fuel injector parameter adjustment signal and the diagnostic limit adjustment signal when operating on the secondary fuel.

17. The engine control module of claim 15, wherein:
the primary fuel is a gasoline-based fuel;
the secondary fuel is a gaseous fuel;
the primary calibration data is gasoline fuel calibration data; and
the secondary calibration data is gaseous fuel calibration data.

18. The engine control module of claim 15, wherein the primary calibration data and the secondary calibration data comprise respective fuel system trim diagnostic thresholds, stoichiometric air/fuel ratios, equivalence ratio biases, and post oxygen sensor biases.

19. The engine control module of claim 15, wherein the primary calibration data and the secondary calibration data comprise respective injector flow values, injector offsets, and injector minimum pulse widths, lost fuel values and transient fuel values.

20. The engine control module of claim 14, further comprising:

a diagnostic module that generates an output signal based on second fuel trim diagnostic threshold calibrations, and a second lean fuel trim limit offset and a second rich fuel trim limit offset received from the fuel injector control module via the network; and a torque estimation module that controls a maximum output torque of the engine based on the torque limiting signal which may be generated based on signals received from the fuel injector control module by limiting air per cylinder of the engine during a startup of the engine and preheating of the secondary fuel.

* * * * *